United States Patent
Johnson et al.

(10) Patent No.: US 6,802,341 B1
(45) Date of Patent: Oct. 12, 2004

(54) TAP

(75) Inventors: Mark Ian Johnson, Richmond (AU);
Alfred Blochlinger, Richmond (AU);
Brian Charles Hamann, Corio (AU);
Hugh Yean Fung, Wantirna South (AU)

(73) Assignee: Australian Dynamic Products PTY Ltd., Victoria (AU)

( * ) Notice: Subject to any disclaimer, the term of this patent is extended or adjusted under 35 U.S.C. 154(b) by 65 days.

(21) Appl. No.: 10/070,883

(22) PCT Filed: Sep. 8, 2000

(86) PCT No.: PCT/AU00/01079

§ 371 (c)(1),
(2), (4) Date: Jul. 22, 2002

(87) PCT Pub. No.: WO01/18439

PCT Pub. Date: Mar. 15, 2001

(30) Foreign Application Priority Data

Sep. 8, 1999 (AU) .............................................. PQ2703

(51) Int. Cl.[7] .................................................. E03C 1/02
(52) U.S. Cl. ...................... 137/636.2; 137/801; 251/104
(58) Field of Search .............................. 137/636.2, 801; 251/104

(56) References Cited

U.S. PATENT DOCUMENTS

| | | | |
|---|---|---|---|
| 3,938,556 A | 2/1976 | Hicks | 137/636.4 |
| 4,457,452 A | 7/1984 | Symmons | 222/20 |
| 4,709,728 A | 12/1987 | Ying-Chung | 137/636.4 |
| 4,960,154 A | 10/1990 | Dagiantis | 137/625.17 |
| 5,108,075 A | 4/1992 | Downard et al. | 251/209 |
| 5,181,580 A | 1/1993 | Burg | 180/116 |
| 5,363,880 A | 11/1994 | Hsieh | |
| 5,762,317 A | 6/1998 | Frahm et al. | 251/95 |
| 6,035,463 A | 3/2000 | Pawelzik et al. | 4/677 |

FOREIGN PATENT DOCUMENTS

| | | |
|---|---|---|
| DE | 4432873 A1 | 9/1994 |
| DE | 29823039 U1 | 2/1999 |
| EP | 0933573 A2 | 8/1999 |
| FR | 2535433 A1 | 5/1984 |

*Primary Examiner*—Gerald A. Michalsky
(74) *Attorney, Agent, or Firm*—Blakely Sokoloff Taylor & Zafman

(57) ABSTRACT

A tap (4) including a tap body (6) within which is located a valve (14), an operating handle (12) mounted on the body and coupled to the valve, a security button (42) which is interlocked with the handle and/or valve, the arrangement being such that the valve can only be opened after activation of the security button.

18 Claims, 24 Drawing Sheets

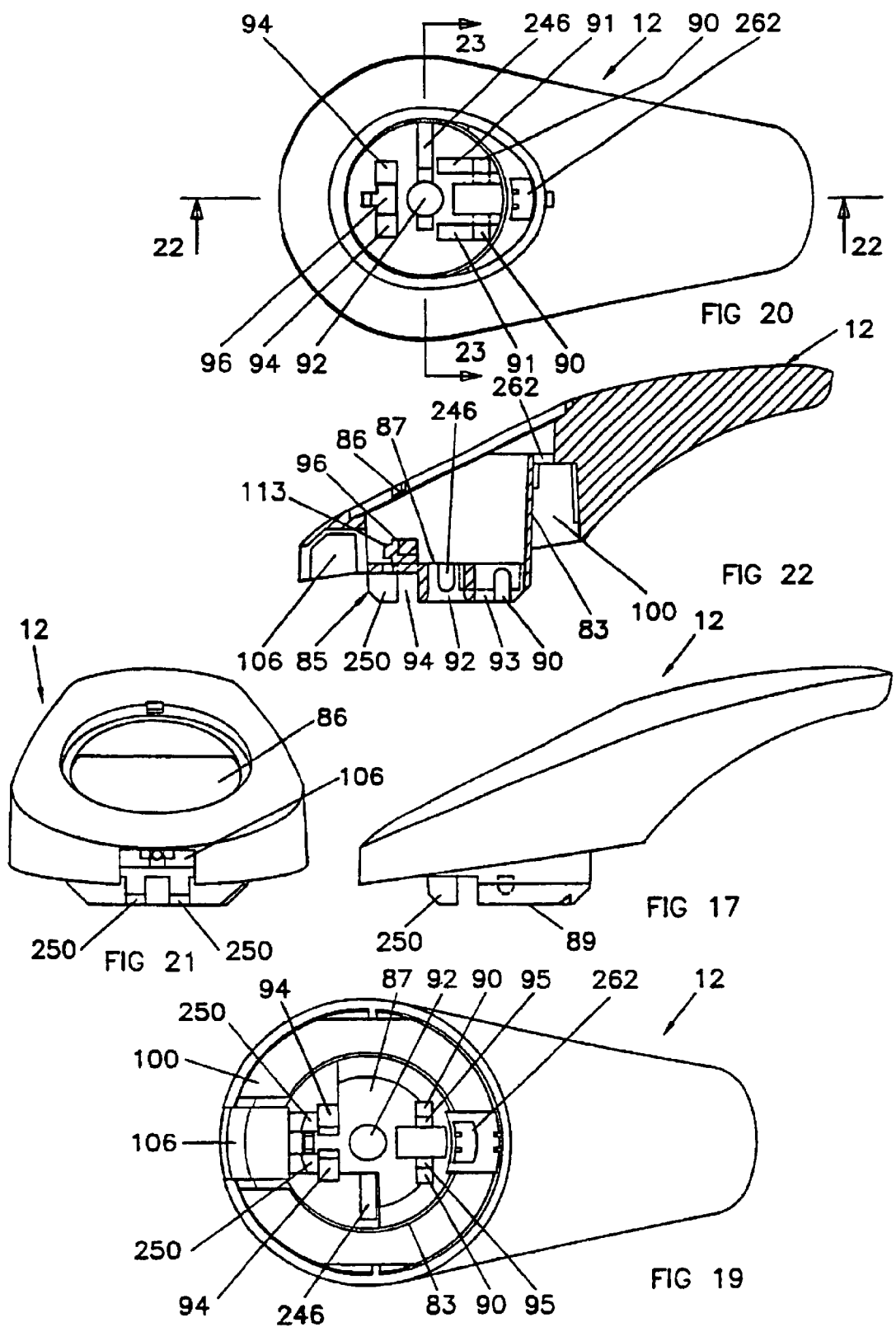

SECTION B:B

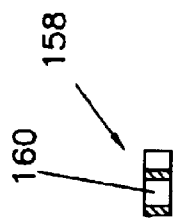
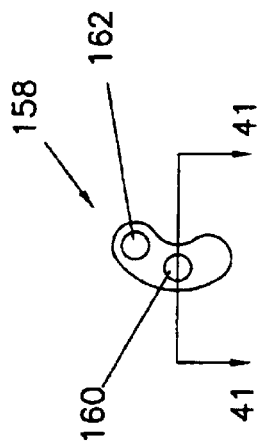
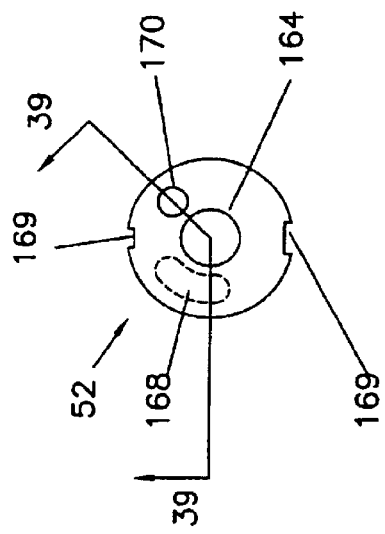
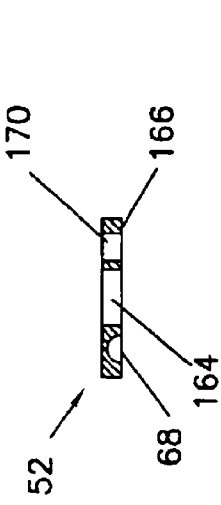
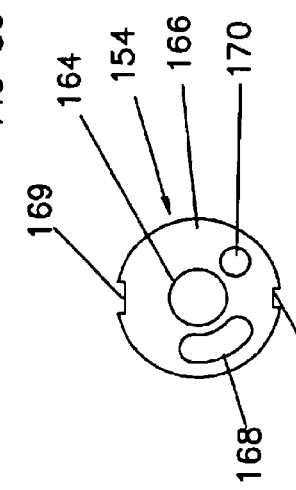

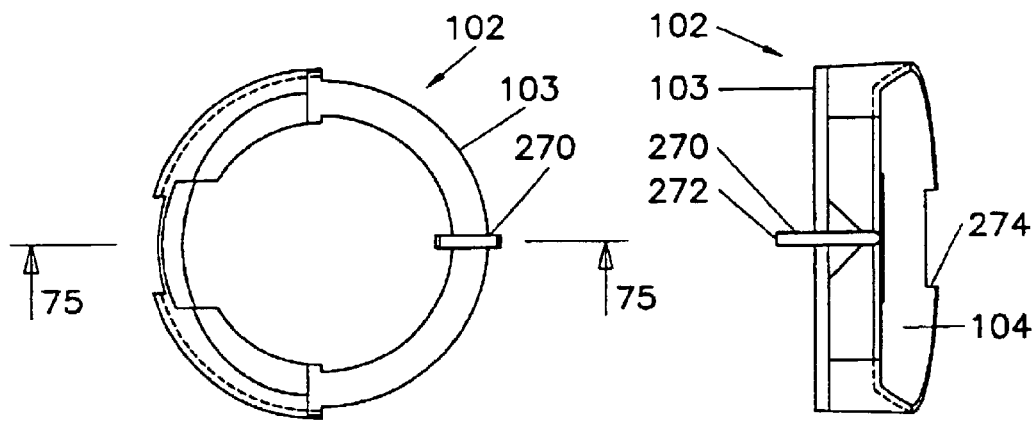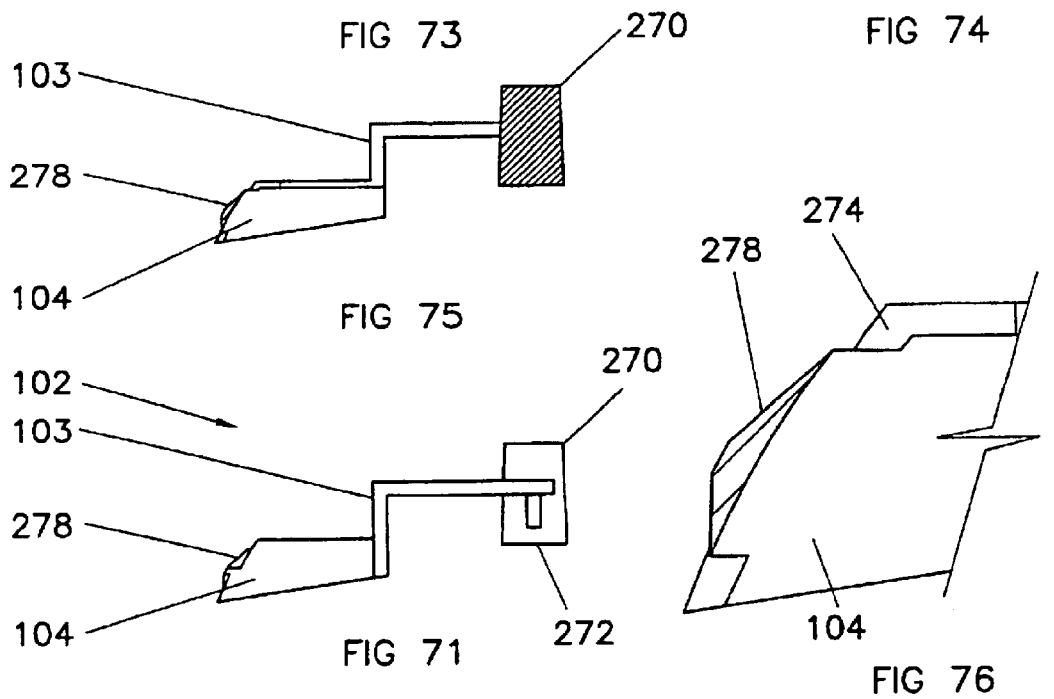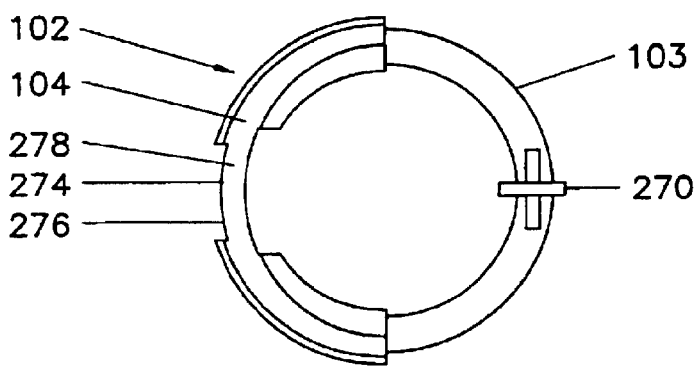

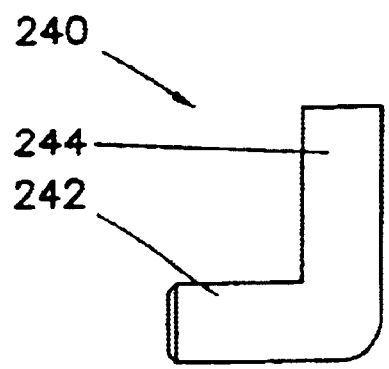
FIG 77
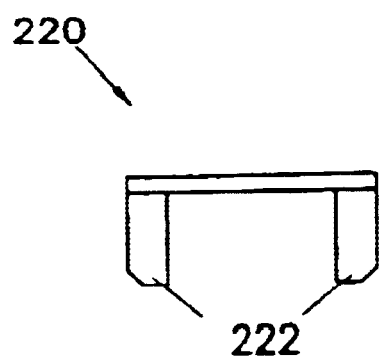
FIG 80
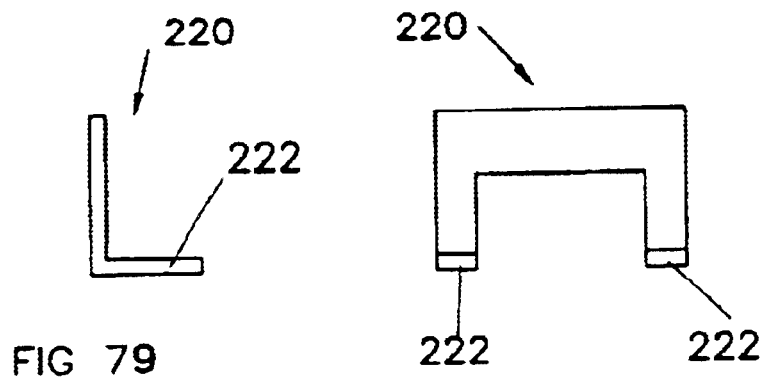
FIG 79
FIG 78

TAP

It is known to provide mixing taps which have inputs from different sources, such as cold and hot water supplies. Normally, these are mixed in accordance with the position of a handle. In some arrangements the handle is arranged for biaxial rotation European Patent No. EPO 933573 is an example of a tap of this sort. In this arrangement the tap has hot and cold water inputs and by operation of a biaxially rotatable handle, mixed water from the inputs can be supplied to a faucet or to a sprayer. The handle is provided with a lever arm which can latch with the valve body so that the user, on operation of the lever, can rotate the handle about a horizontal axis in order to select water at a determined temperature to be delivered to the sprayer.

The object of the present invention is to provide a tap which has two inputs but which separately delivers water to two outlets without any mixing and further to provide a security element which needs to be activated before fluid is delivered from the second outlet. This capability enables the tap to be connected to a hot water boiler and the security element improves the safety of the tap because it minimises the possibility that boiling water is inadvertently dispensed from the tap According to the present invention there is provided a tap including:

a tap body;

a valve assembly located within the body;

an operating handle mounted on the body and coupled to the valve assembly;

the body having a first part spherical bearing surface and the handle being provided with a complementary bearing surface whereby the handle is capable of biaxial rotation about first and second axes relative to the tap body; wherein the valve assembly includes:

first valve means for controlling flow of a first liquid from a first inlet to a first outlet, the first valve means including a first valve element which opens when the handle is rotated from a closed position about said first axis in a first sense to first open position to permit flow of the first liquid through the valve assembly;

second valve means for controlling flow of a second liquid from a second inlet to a second outlet, the second valve means including a second valve element which opens when the handle has been rotated from said closed position about said first axis in a second sense opposite to said first sense to an active position and then rotated about said second axis; and a security element having a locked position in which it prevents rotation of the handle about said second axis, the security element being such that it can be moved to an unlocked position when the handle is in said active position so that the handle can rotate about the second axis to a second open position to thereby permit flow of the second liquid through the valve assembly.

The invention will now be further described with reference to the accompanying drawings, in which:

FIG. 13 is a plan view of the upper body part;

FIG. 15 is a cross-sectional view along the line 15—15;

FIG. 16 is a fragmentary cross-sectional view along the line 16—16;

FIG. 17 is a side view of the handle;

FIG. 19 is an underside view of the handle;

FIG. 20 is a plan view of the handle;

FIG. 21 is a rear view of the handle;

FIG. 22 is a cross-sectional view along the line 22—22;

FIG. 37 is an underside view of a ceramic disc;

FIG. 38 is a plan view of the ceramic disc;

FIG. 39 is a sectional view along the line 39—39;

FIG. 40 is plan view of a ceramic insert;

FIG. 41 is a sectional view along the line 41—41;

FIG. 71 is a side view of a handle sleeve;
FIG. 72 is an underside view of the handle sleeve;
FIG. 73 is a plan view of the handle sleeve;
FIG. 74 is a front view of the handle sleeve;
FIG. 75 is a cross-sectional view along the line 75—75;
FIG. 76 is a more detailed fragmentary cross-sectional view of part of the handle sleeve;
FIG. 77 is a side view of a handle mounting pin;
FIG. 78 is a side view of a handle mounting plate;
FIG. 79 is an end view of the handle mounting plate; and
FIG. 80 is a plan view of the handle mounting plate.

Figure 1:
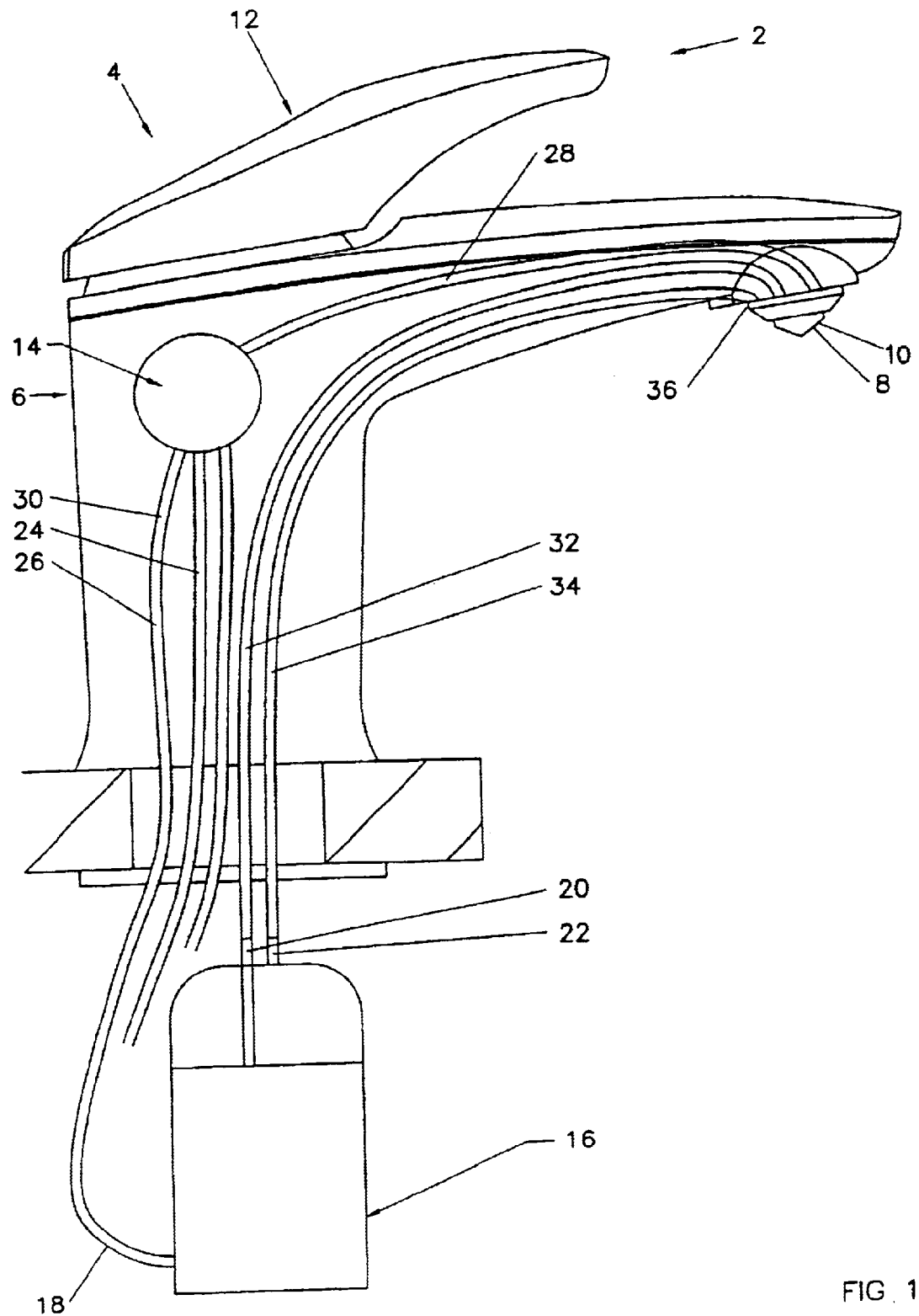
FIG. 1 is a perspective view of a dual tap of the invention mounted for dispensing cold water and boiling water.

FIG. 1 schematically illustrates a dispensing system 2 for dispensing cold and boiling water from a tap 4. The tap 4 includes a body 6, outlet nozzles 8 and 10 and operating handle 12 (the nozzle 10 is located behind the nozzle 8, in the drawing of FIG. 1). Within the body 6 and coupled to the handle 12 is a valve assembly 14. The system includes a boiler 16 which has a cold water inlet 18, boiling water outlet 20 and vent outlet 22. The valve assembly 14 receives chilled water on inlet line 24 and cold water on inlet line 26. It is not energy efficient to supply chilled water to the boiler 16 and so a separate inlet line 26 is provided for this purpose. The valve assembly is arranged to deliver cold water via line 28 to the cold water nozzle 10 or cold water to the inlet 18 of the boiler via line 30. As will be explained below, the user operates the handle 12 in order to deliver either chilled water directly to the nozzle 10 or cold water to the inlet 18 of the boiler by manipulation of the handle 12. When the boiler 16 receives cold water at its inlet 18, boiling water is expelled from the outlet 20 and delivered to the nozzle 8 by means of a boiling water line 32. A vent line 34 is connected from the vent outlet 22 to a vent opening 36 adjacent to the nozzles 8 and 10. Normally the nozzles 8 and 10 will be located above a sink or the like so that any condensation produced at the vent opening 36 will drip into the sink.

Because the preferred embodiment of the invention is capable of delivering chilled water and boiling water from a single tap, the tap 4 includes a child safety button to prevent inadvertent delivery of boiling water.

Figure 2:
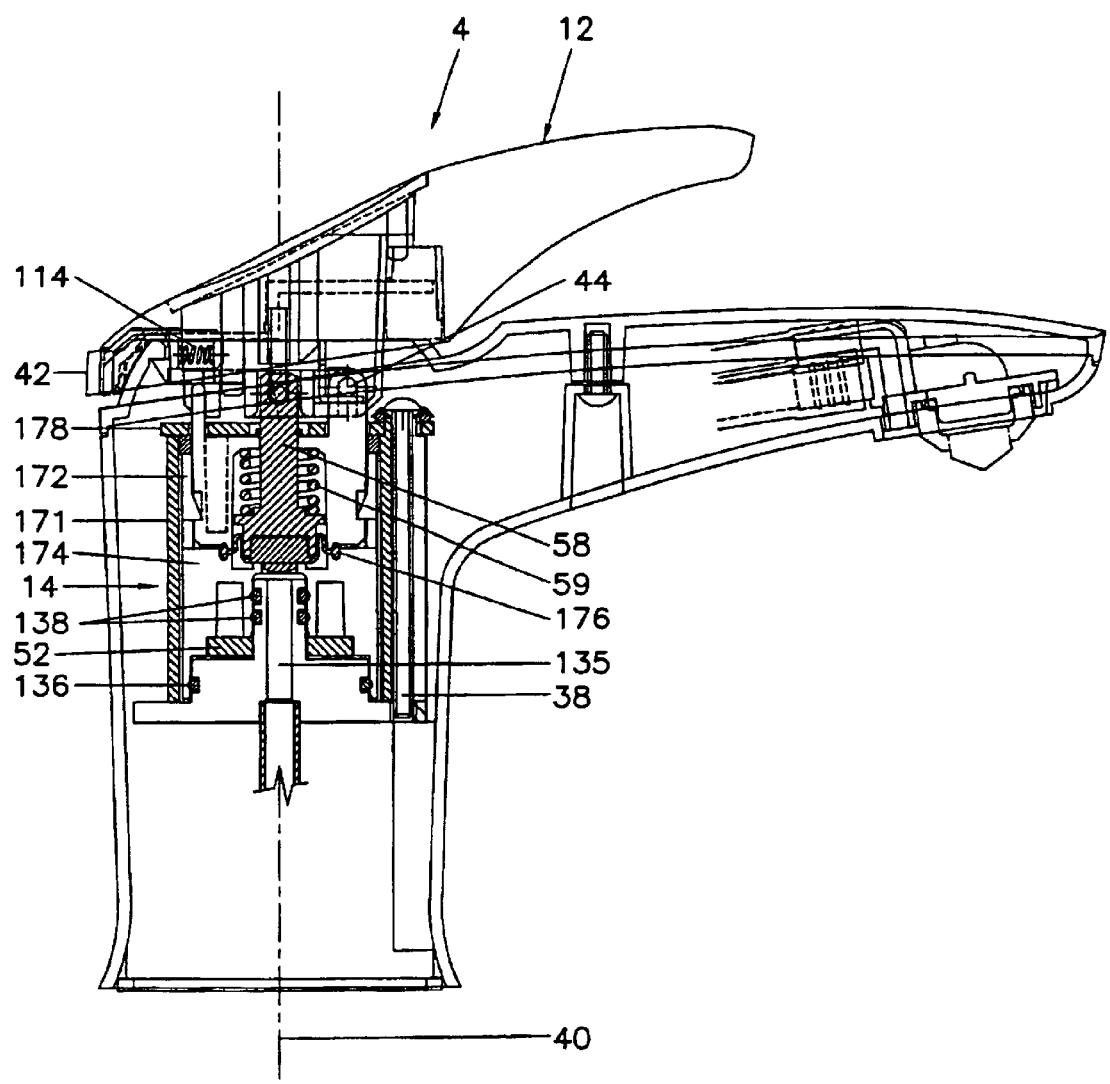
FIG. 2 is a more detailed cross-sectional view of the tap.

FIG. 2 illustrates in more detail the tap 4 of the invention. It will be seen that the valve assembly 14 is mounted within the valve body 6 by means of three upper mounting screws 38, only one of which is shown in FIG. 2. The handle 12 is capable of biaxial rotation. It is rotatable about a vertical axis 40. Rotation of the handle 12 anti-clockwise from a central position (as seen from above) will cause delivery of chilled water to the nozzle 10. Rotation of the handle 12 in a clockwise direction does not cause the assembly 14 to deliver water from the boiling water outlet nozzle 8. First, a child safety button 42 must be activated to then permit the handle 12 to be rotated downwardly so as to permit boiling water to be delivered from the boiler 16 through the nozzle 8. The handle 12 pivots about a horizontal axis 44 which is formed between the handle 12 and the valve assembly 14, as will be described in more detail below.

Figure 3:
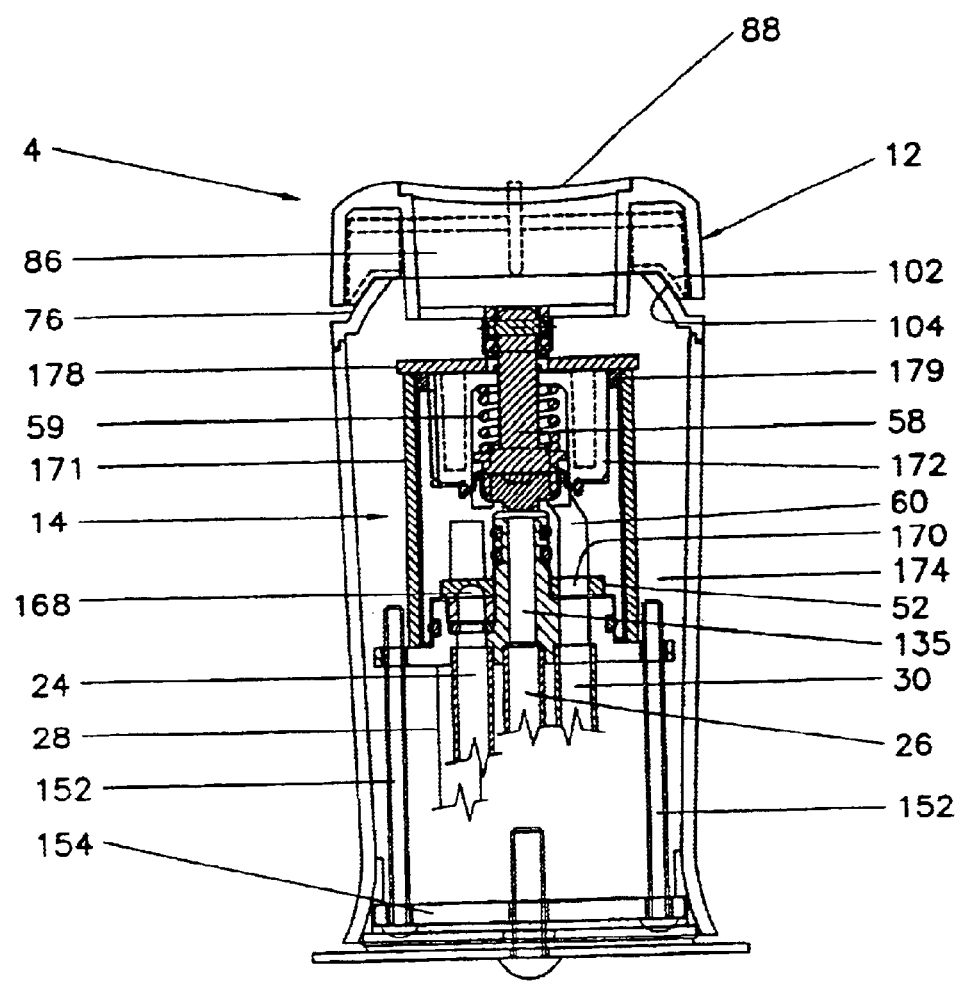
FIG. 3 is a more detailed transverse cross-sectional view of the tap.
Figure 4:
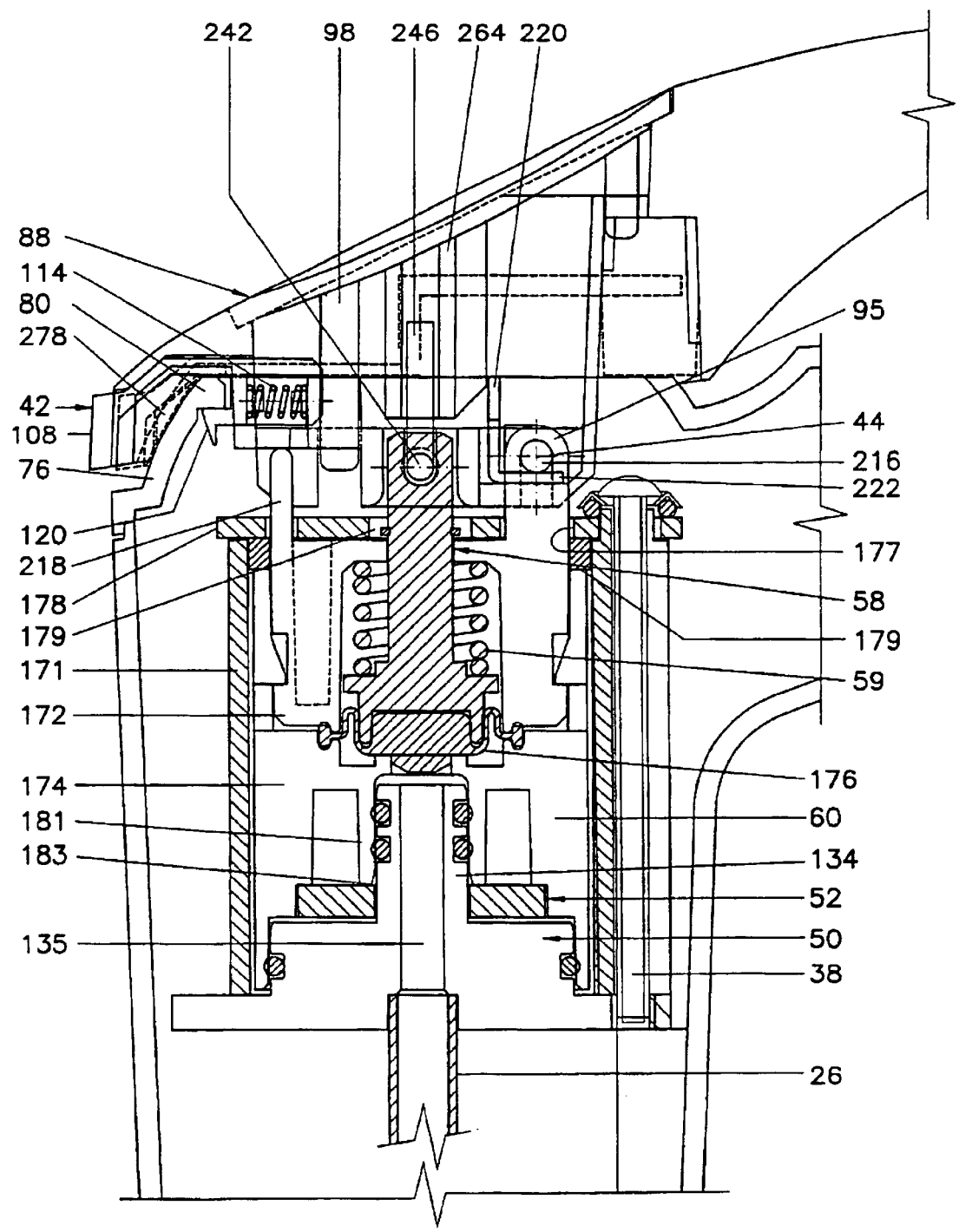
FIG. 4 is a simplified cross-sectional view on a larger scale.

The valve assembly 14 includes a valve plate 50, as best seen in FIGS. 3 and 4. The valve plate 50 has soldered thereto the lines 24, 26, 28 and 30. These communicate with ducts extending through the valve plate, as will be described in more detail below. The valve plate also cooperates with a ceramic valve disc 52. The valve disc 52 is provided with a recess 168. On rotation of the disc 52 about the axis 40, the recess 168 can be aligned with the ducts which connect with the lines 24 and 28 thereby enabling delivery of chilled water to the nozzle 10. The disc 52 has a bore 170 therethrough which can be aligned with a bore through the plate 50 which is coupled to the line 30 on appropriate rotation of the disc 52. The valve assembly includes a plunger 58 which prevents unchilled water from the line 26 entering the chamber 60 until the plunger 58 is elevated. Elevation of the plunger 58 occurs when the handle 12 is pressed downwardly causing rotation about the axis 44. This permits unchilled water to pass from the line 26 into the chamber 60 and then through the bore 170, plate 50 and into the line 30 extending to the inlet of the boiler 16. This operation will be described in more detail below. Unchilled water entering the inlet of the boiler causes boiling water to be delivered to the nozzle 8 via the line 32.

Figure 14:
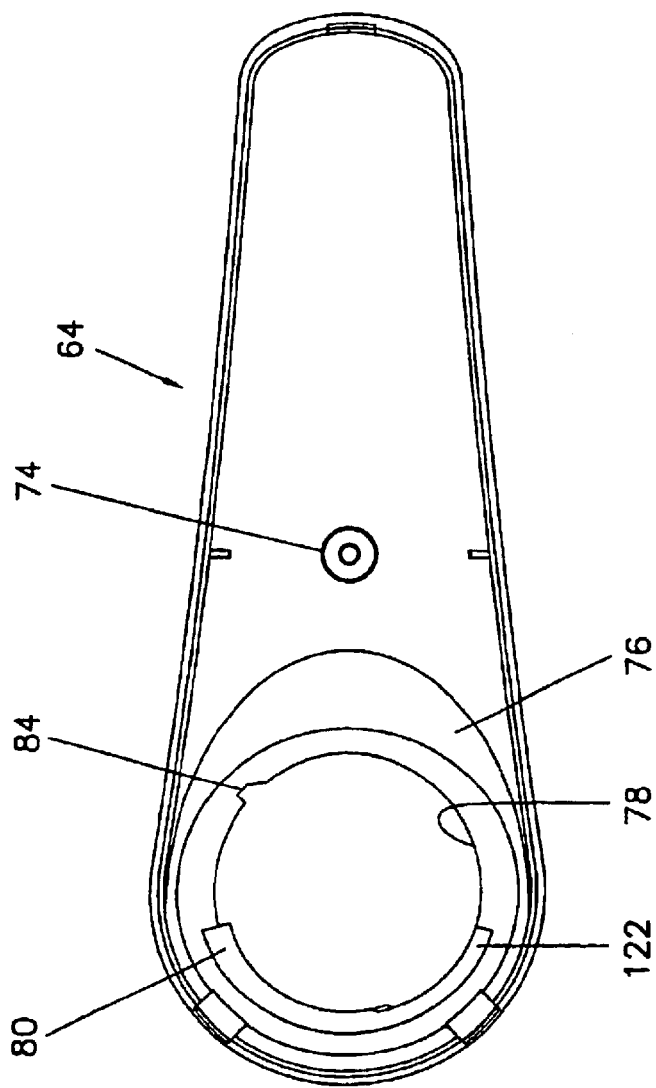
FIG. 14 is an underside view of the upper body part.

The tap body 6 is formed in two parts, a main lower part 62 and an upper part 64. The lower part 62 is illustrated in more detail in FIGS. 6 to 10. Both parts are preferably injection moulded from plastics material. The lower part includes a cylindrical body portion 66 formed with internal ribs 68 which form a support for the valve assembly 14. The main lower part 62 includes a lower spout portion 69 formed with an opening 70 for receipt of the nozzles 8 and 10 which are preferably formed as an integral moulding. The lower and upper parts 62 and 64 preferably have complementary rims so that the parts interlock together. A screw recess 72 is provided in the spout portion 69 for receipt of a screw which is received in a nut (not shown) formed in a boss 74 which is formed in the upper part 64, as best seen in FIGS. 14 and 15. The lines 28, 32 and 34 are located between the body portion 66 and the valve assembly 14.

The upper part 64 is illustrated in more detail in FIGS. 11 to 16. It is provided with a part spherical bearing surface 76 for supporting the biaxial rotation of the handle 12 about the axes 40 and 44. As best shown in FIG. 13, the inner rim 78 of the bearing portion 76 is formed with a tapered cam member 80 which interlocks with part of the child lock button 42, as will be described in more detail below. The rim 78 also includes first and second notches 82 and 84 which also cooperate with the handle 12, as will be described below.

The handle 12 is illustrated in more detail in FIGS. 17 to 25. Generally speaking, the handle 12 performs a number of functions. First, it is coupled to the valve assembly 14 so that anti-clockwise rotation of the handle 12 about the vertical axis 40 will cause chilled water to flow from the nozzle 10. On rotation of the handle 12 in a clockwise direction followed by pressing in the button 42 permits the handle 12 to be rotated downwardly about the axis 44. This causes lifting of the plunger 58 whereby boiling water can be delivered. As best seen in FIG. 22, the handle 12 is moulded with a handle chamber 86 to provide access to components which interconnect the handle 12 with the valve assembly 14. A handle cap 88 is provided to cover the chamber 86. The handle cap 88 is shown in more detail in FIGS. 26 to 32. The chamber 86 is defined by sidewalls 82 and a base 85 having upper and lower faces 87 and 89. The base 85 includes a pair of forward recesses 90, a central bore 92 and a pair of rear recesses 94 which are located on opposite sides of a square opening 93. Projecting upwardly from the upper face 87 of the base 85 is a guide boss 96 located between the rear recesses 90. A slot 246 is formed in the upper face 87 and it extends from the sidewall 83 to a point just beyond the central bore 92. A pair of slots 91 are also formed in the upper face 87 and these extend perpendicularly relative to the slot 246 and are located on either side of the square opening 93. The slots 91 open to the forward recesses 90. On the lower face 89 the recesses 90 connect with the square opening 93 and co-operate to define bridge members 95 which are used to form part of the pivot coupling to the valve assembly to permit rotation about the horizontal axis 44. The bore 92 receives the upper end of the plunger 58. The recesses 94 receive downwardly extending fingers 98 formed on the underside of the cap 88. The handle also includes a forward recess 262 for receipt of forward cap fingers 260 for removably mounting of the cap 88. The guide boss 96 cooperates with the button 42 as will be described in more detail below.

Figure 23:
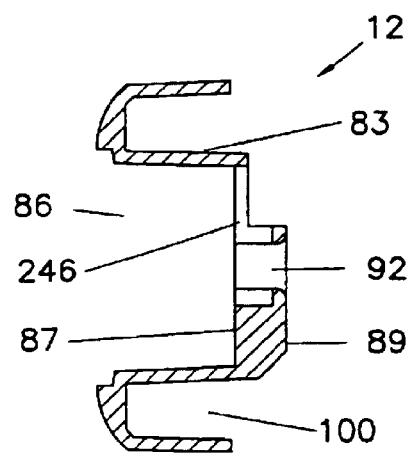
FIG. 23 is a cross-sectional view along the line 23—23.

As best seen in FIGS. 19, 22 and 23, the underside of the handle 12 includes an annular recess 100 for receipt of a handle sleeve 102. The handle sleeve 102 is shown in more detail in FIGS. 71 to 76. The handle sleeve 102 includes part spherical (concave) bearing surface 104 which is complementary in shape to the (convex) bearing surface 76 formed on the top body portion 64. This facilitates rotational movement of the handle 12 about the axes 40 and 44.

As best seen in FIG. 21, the handle 12 includes a rear opening 106 which in use receives the button 42. The opening 106 extends from the outer wall of the handle and through the sidewall 83.

Figure 25:
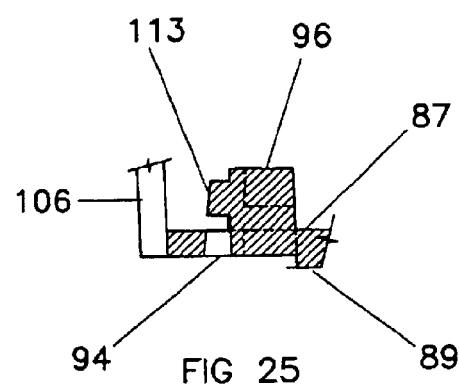
Figure 18:
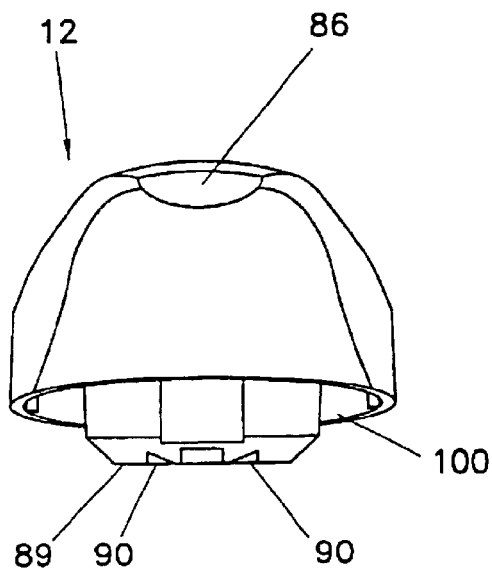
FIG. 18 is a front view of the handle.
Figure 28:
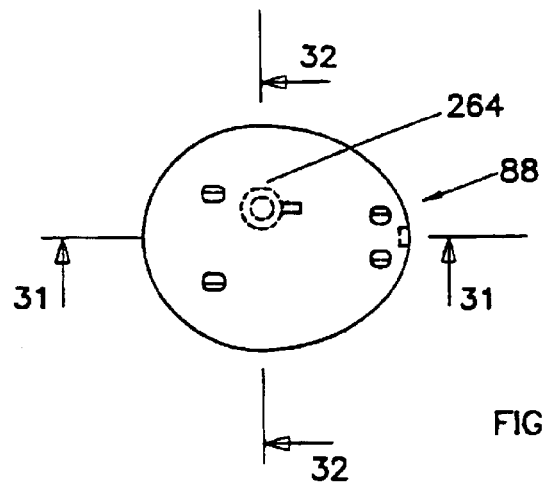
FIG. 28 is a plan view of the handle cap.

The button 42 is illustrated in more detail in FIGS. 66 to 69. The button includes an outer press plate portion 108 projecting downwardly from a body portion 110. The interior of the body portion 110 includes a keyway 112 which is generally complementary in shape to the guide boss 96 of the handle 12. This enables the button 42 to be slidably mounted in the opening 106 of the handle 12. As best seen in FIG. 2, a compression spring 114 acts between the opposed faces of the boss 96 and a wall portion 116 of the button 42 defined at the inner end of the keyway 112. The wall 116 may include a spring locating boss 118 for the one end of the spring 114. The other end of the spring 114 is supported by a second spring locating boss 113 formed on the guide boss 96, as best seen in FIG. 25.

Figure 24:
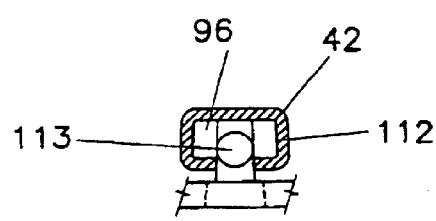
FIGS. 24 and 25 are more detailed fragmentary views of pad of the handle.
Figure 70:
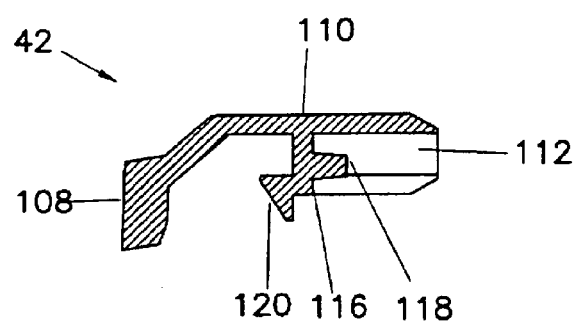
FIG. 70 is a cross-sectional view along the line 70—70.
Figure 69:
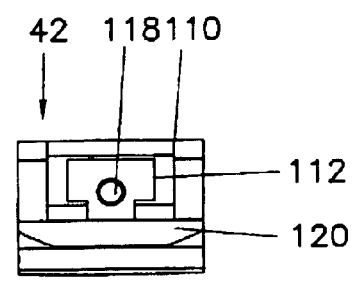
FIG. 69 is a front view of the button.
Figure 66:
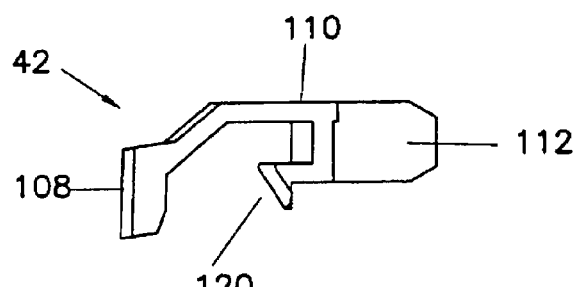
FIG. 66 is a side view of a child lock button.
Figure 67:
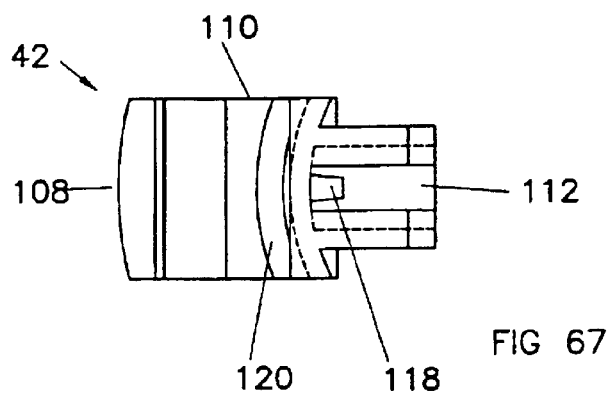
FIG. 67 is an underside view of the button.

FIG. 24 diagrammatically shows the guide boss 96 located within the keyway 112 of the button 42. The button 42 also includes an interlocking projection 120 as shown in FIG. 70 which extends rearwardly from the wall 116 and cooperates with the cam 80 on the upper tap portion, as will be described below.

As shown in FIG. 4, the button 42 is in its extended position and the outer press plate 108 projects from the surface of the handle 12. Also, it will be seen that the interlocking projection 120 engages the underside of the cam 80. This prevents the handle 12 being rotated about the horizontal axis 44.

Figure 5A:
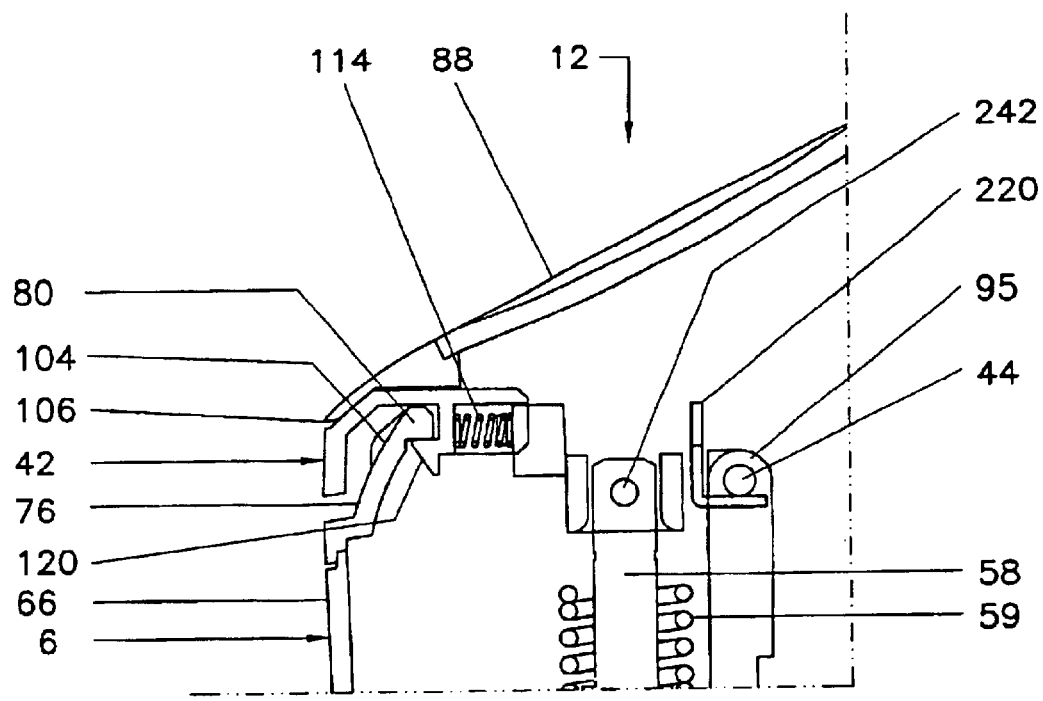
FIGS. 5A and 5B are schematic views which illustrate the function of the tap.
Figure 5B:
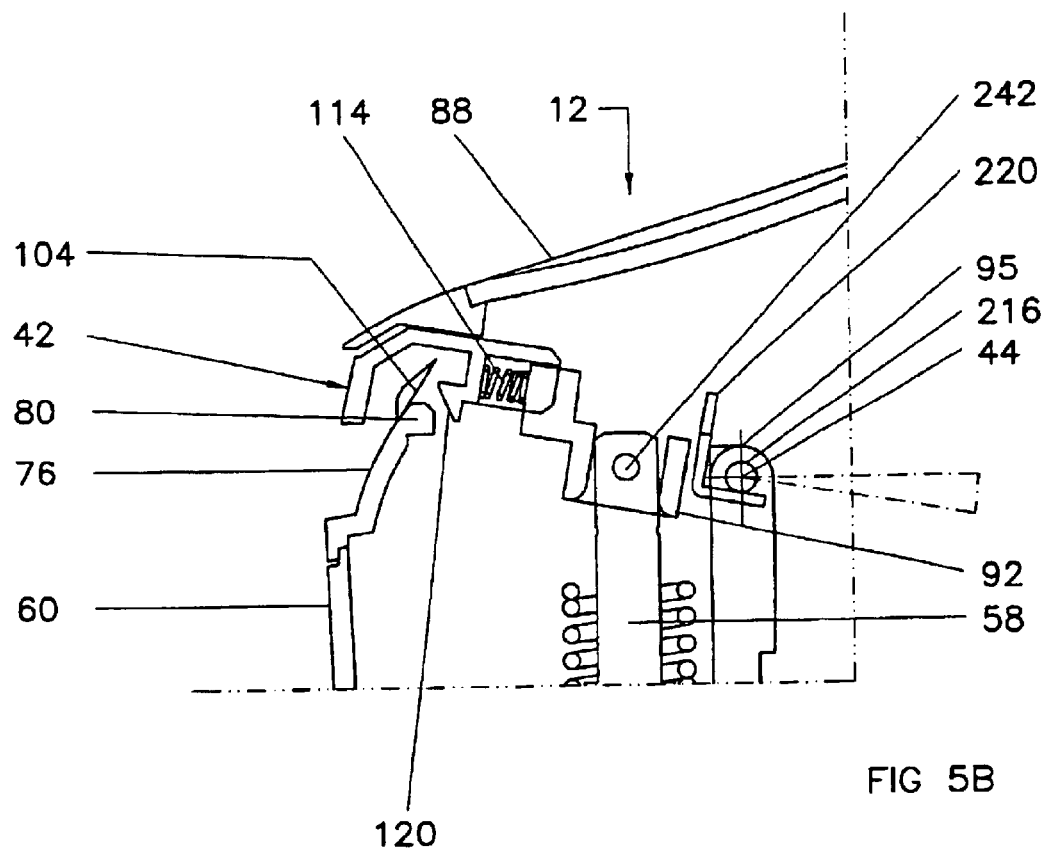
Figure 6:
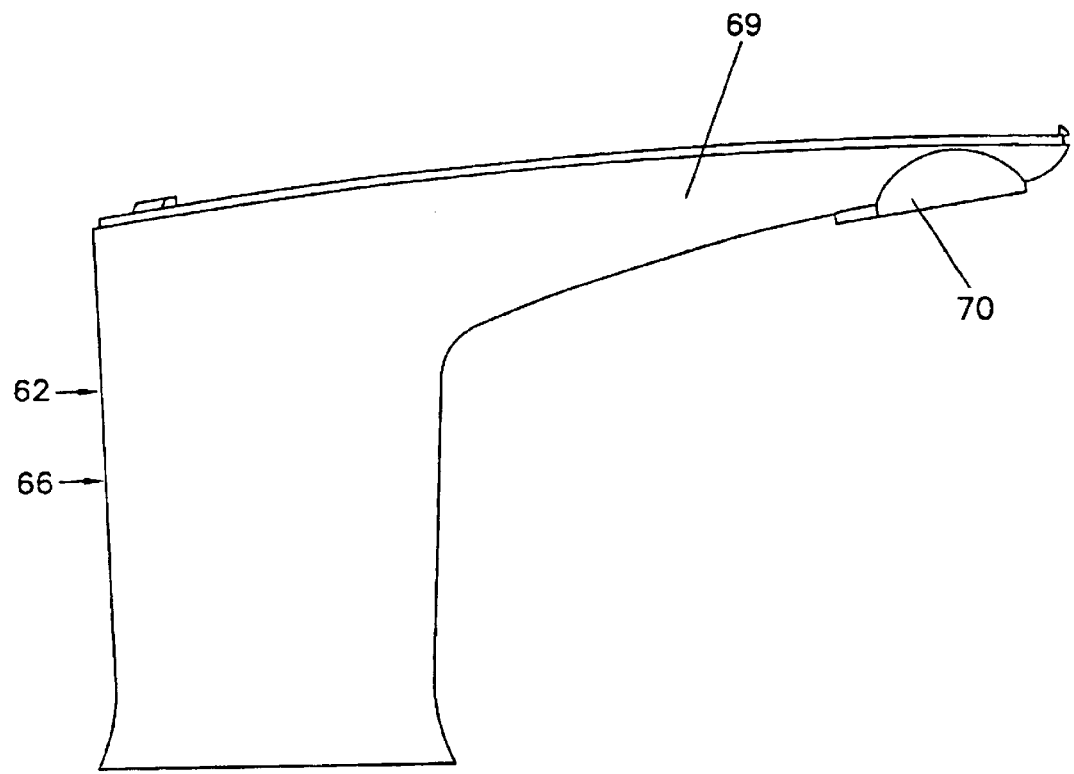
FIG. 6 is a side view of the main body of the tap.
Figure 8:
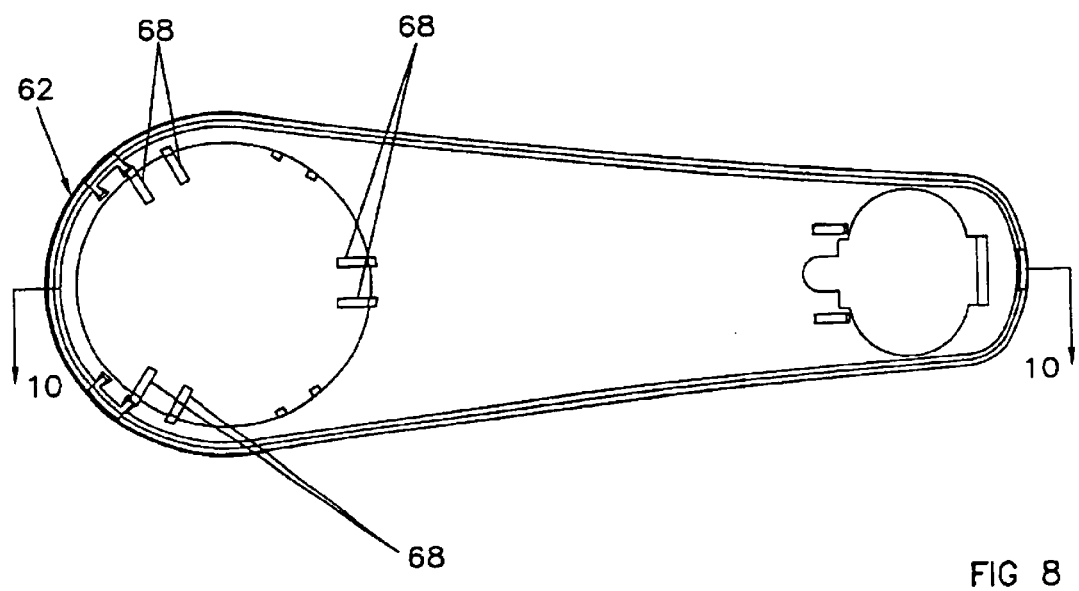
FIG. 8 is a plan view of the main body.
Figure 7:
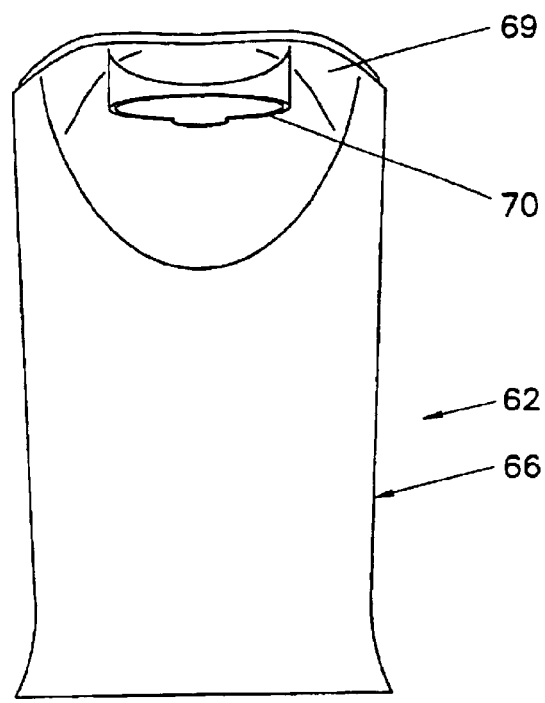
FIG. 7 is a front view of the body.
Figure 9:
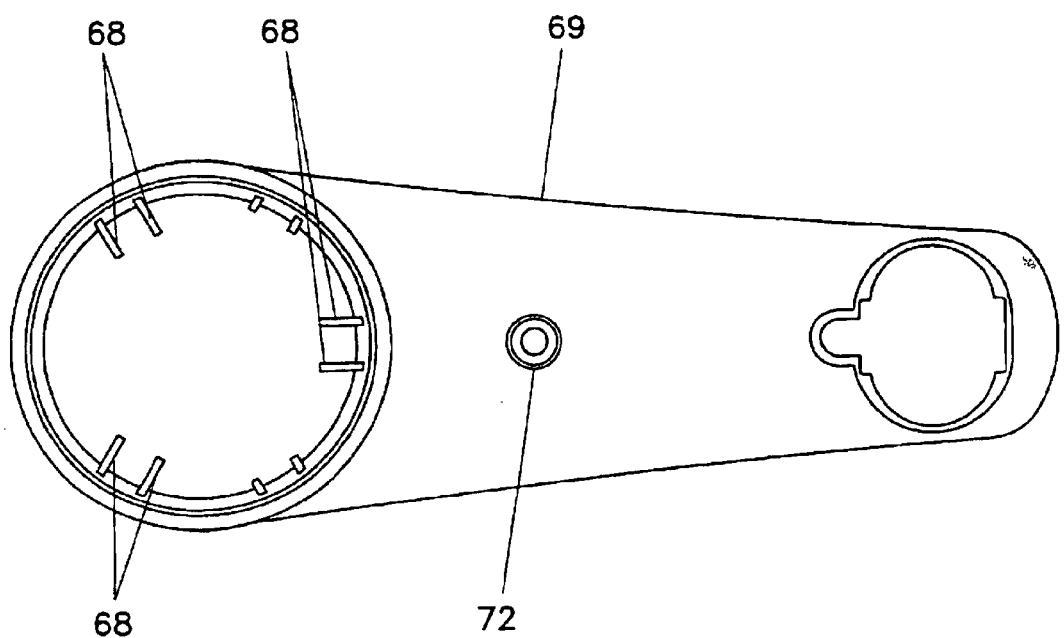
FIG. 9 is an underside view of the main body.
Figure 10:
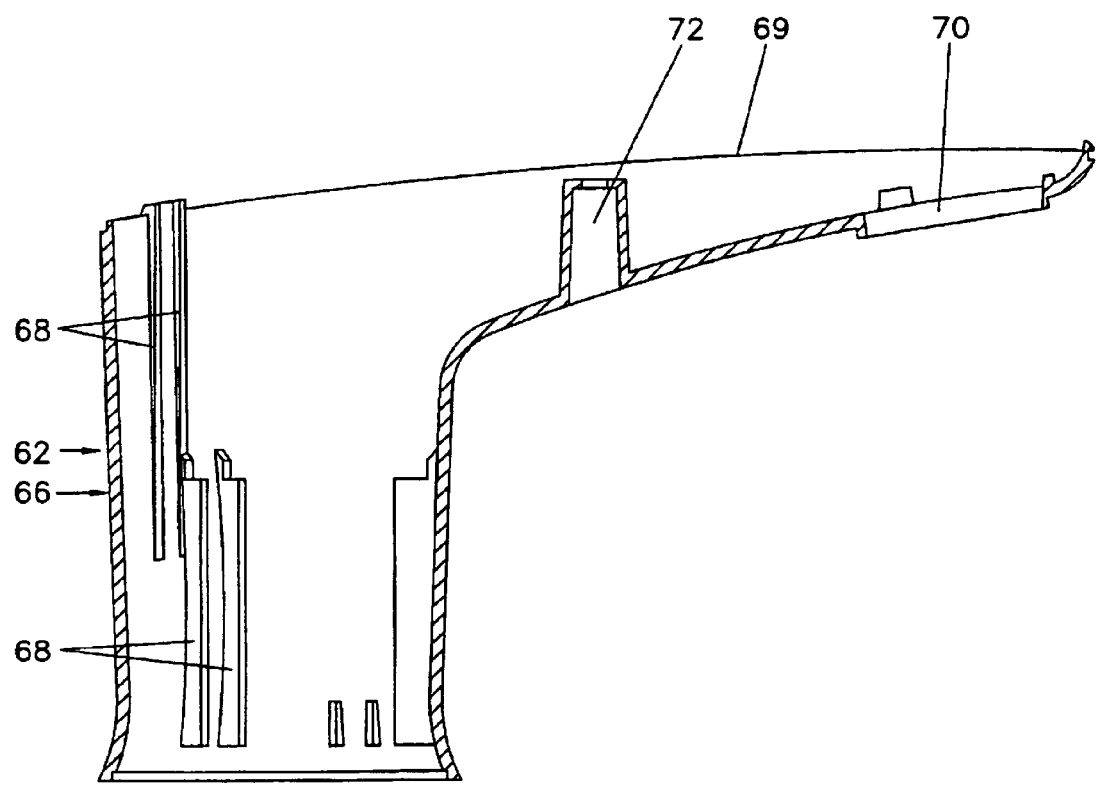
FIG. 10 is a cross-sectional view along the line 10—10.
Figure 11:
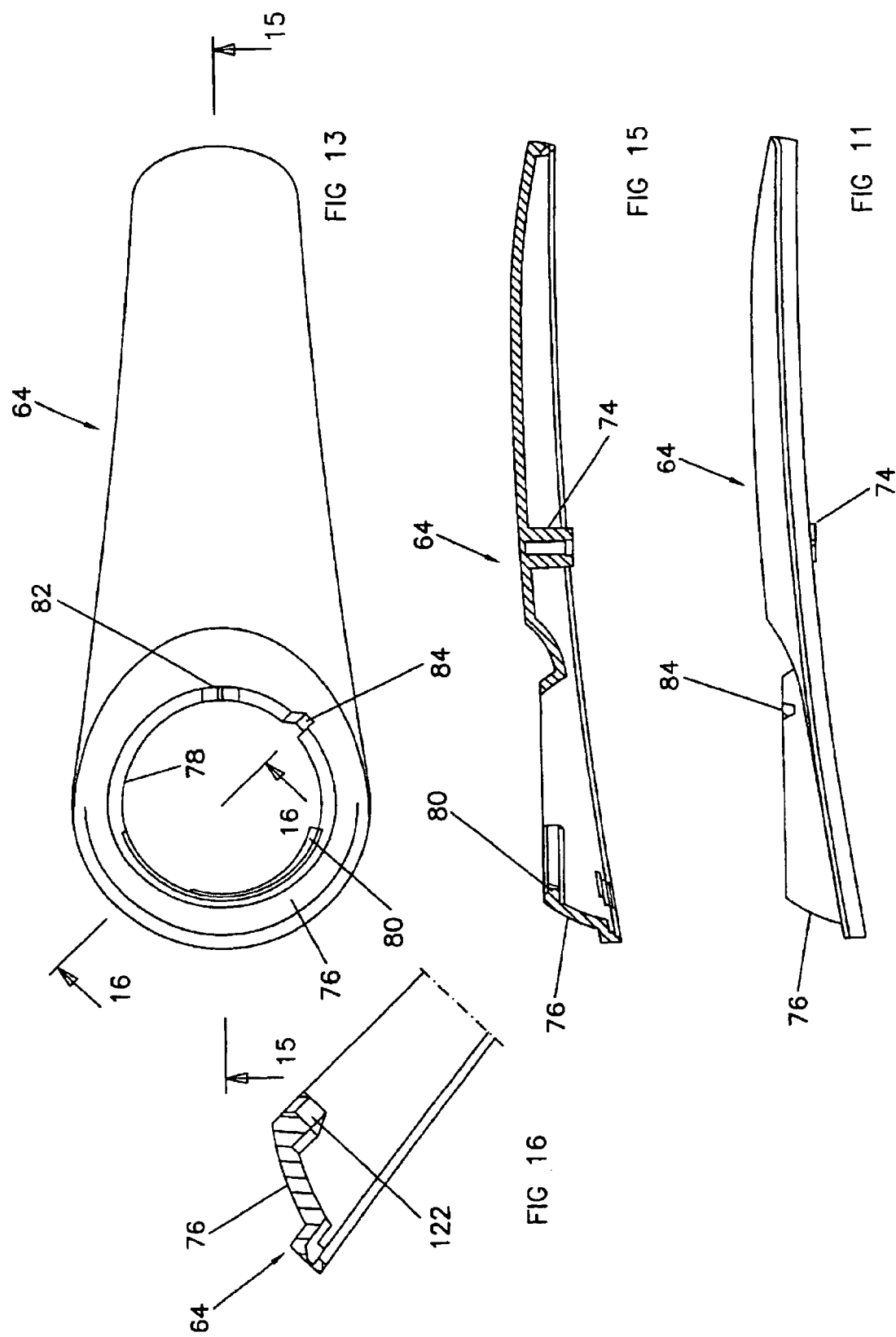
FIG. 11 is a side view of an upper tap body part.
Figure 12:
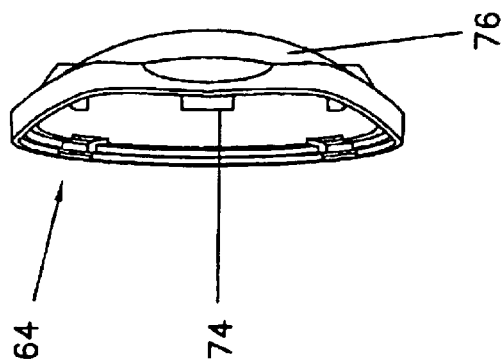
FIG. 12 is a front view of the upper body part.

FIG. 5A diagrammatically shows the handle 12 in a position in which it has been rotated clockwise from its central position so that the projection 120 lies adjacent to a narrow portion 122 of the cam 80. The button 42 is also shown in a position in which it has been slid inwardly in the opening 106 against the resilient bias of the spring 114. The projection 120 is now clear of the narrow portion 122 of the cam and the user can apply downward force on the handle 12 in order to rotate the handle 12 about the horizontal axis 44 to the position shown in FIG. 5B. This causes a levering up of the plunger 58 which permits flow of boiling water from the boiler 16. The projection 120 has an inclined face 121 which is presented to the cam 80 to facilitate disengagement therewith so as to ensure that the button returns to its retracted position as shown in FIG. 4.

The valve assembly 14 will now be described in more detail with reference to FIGS. 33 to 65.

FIGS. 33 to 36 illustrate the valve mounting plate 50 in more detail. The mounting plate 50 is preferably machined from brass. It has a base portion 130, central body 132 and spigot 134. The body 132 is provided with a groove for receipt of an O-ring 136 and the spigot 134 is provided with a pair of grooves for receipt of a pair of O-rings 138. The base 130 is formed with stepped bores 140, 142, 144 and 146 which form ports for the valve. The bores 140 and 146 form mounting points for the copper lines 24 and 28. A bore 135 extends through the spigot 134 and communicates with the bore 42 which forms a mounting point for the inlet line 26 and the bore 144 forms a mounting for the line 30 which extends to the inlet 18 of the boiler 16. The base portion 130 is provided with three threaded sockets 148 for receipt of the upper mounting screws 38 and a pair of diametrically opposed threaded sockets 150 for receipt of the lower mounting screws 152. The edge of the base portion 130 includes recesses 149 to provide a space between the base portion 130 and the cylindrical body portion 66 of the tap body for the lines 28, 32 and 34.

As best seen in FIG. 3, a pair of lower mounting screws 152 couple the base portion 130 to a lower mounting plate 154 for fixing the valve assembly 14 in the cylindrical body portion 66 of the tap.

The central body portion 132 includes an upper valve face 153 against which the ceramic valve disc 52 is seated. The face 153 includes a crescent shaped recess 156 in which a complementary shaped ceramic insert 158 is located. The insert 158 has a bore 160 which is aligned with the bore 140 of the plate 50. As best seen in FIG. 40, the insert 158 has a second bore 162 which is aligned with the bore 146. The top of the insert 158 is flush with the face 153 and also bears against the adjacent surface of the ceramic disc 52 in a watertight manner.

The ceramic disc 52 and ceramic insert 158 are shown in more detail in FIGS. 37 to 41. It will be seen that the disc 52 includes a central bore 164 through which the spigot 134 passes. The lower face 166 of the disc 52 includes the part annular recess 168 which extends through about 55% of arc. The disc also includes the bore 170 and diametrically opposed keyways 169 on its outer periphery. The keyways 169 enable interlocking with other parts of the valve assembly so that the disc 52 is rotated with the handle 12 when it is rotated about the axis 40 but the mounting plate 50 remains stationary.

Figure 42:
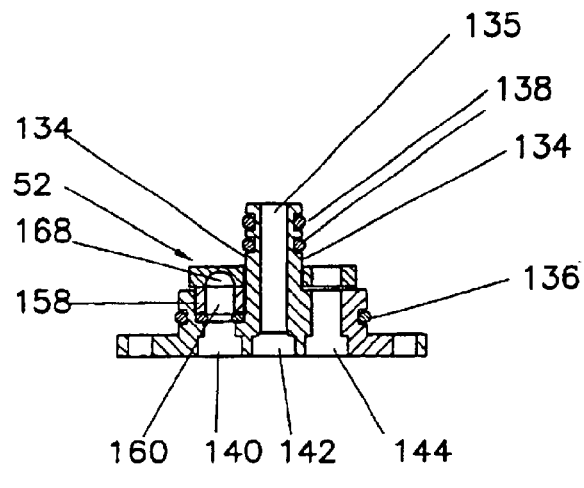
FIGS. 42 and 43 are fragmentary cross-sectional views illustrating the manner in which the ceramic disc and insert co-operate.

FIG. 42 shows the position of the upper ceramic disc 52 when the handle 12 has been rotated anti-clockwise from centre for delivery of chilled water. In this position, the recess 168 forms a passageway between the bores 140 and 146 thereby enabling delivery of chilled water from the line 24 to the fine 28. The disc 52 closes the bore 144 in this position.

Figure 43:
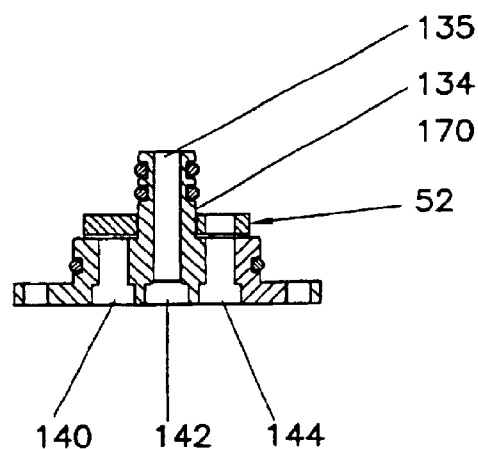
Figure 48:
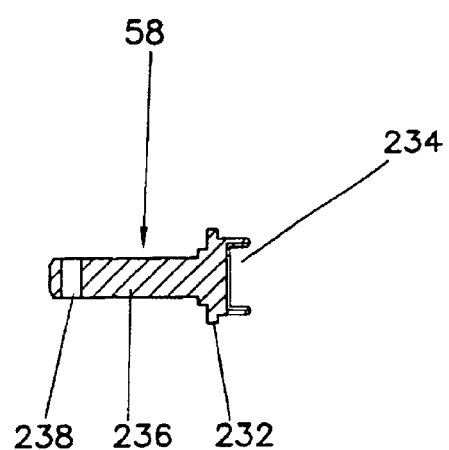
FIG. 48 is a cross-sectional view along the fine 48—48.
Figure 46:
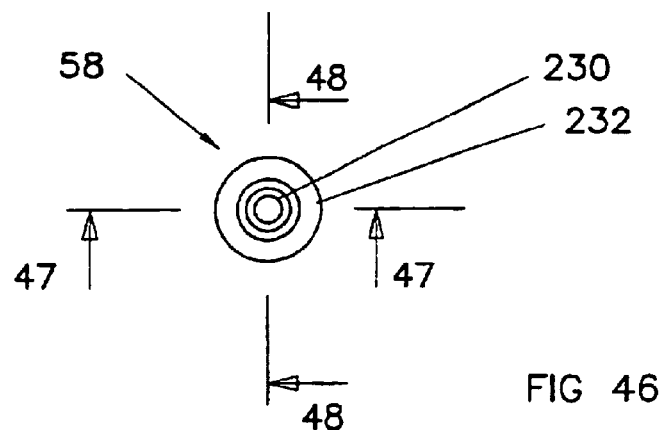
FIG. 46 is a plan view of the plunger.
Figure 47:
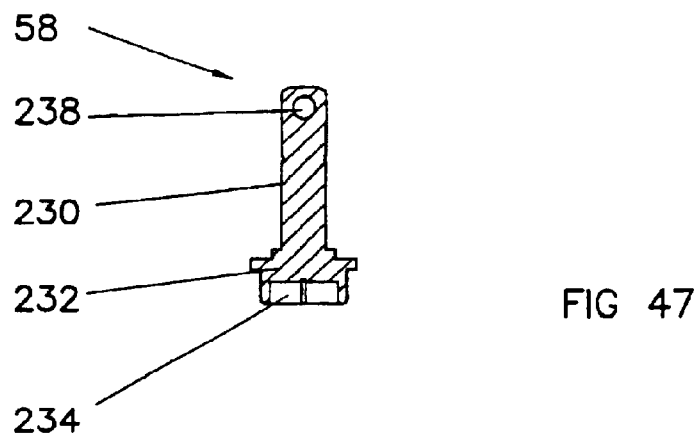
FIG. 47 is a cross-sectional view along the line 47—47.
Figure 44:
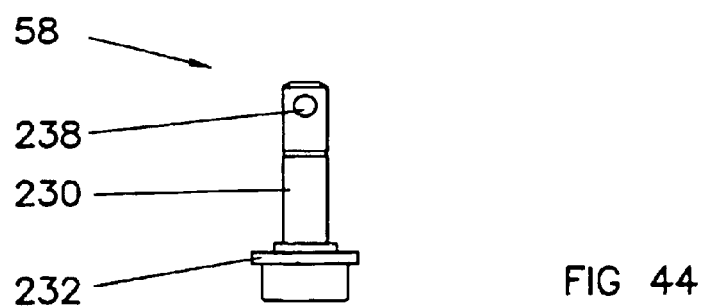
FIG. 44 is a side view of plunger.
Figure 45:
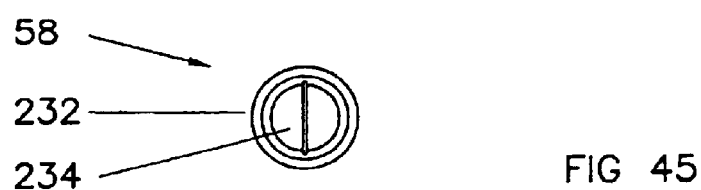
FIG. 45 is an underside view of the plunger.
Figure 51:
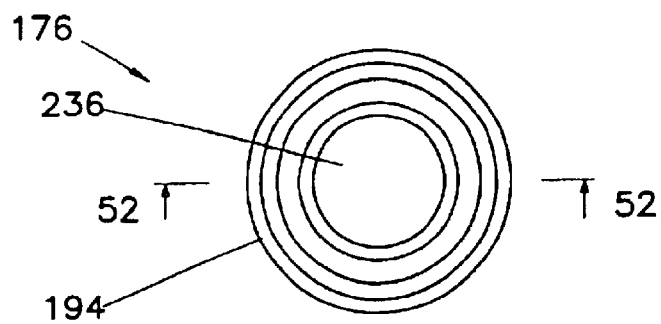
FIG. 51 is a plan view of the diaphragm.
Figure 52:
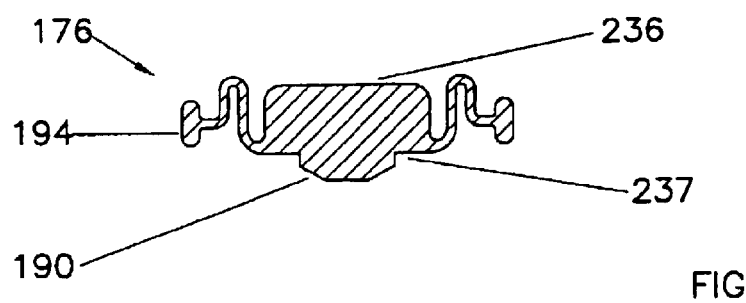
FIG. 52 is a cross-sectional view along the line 52—52.
Figure 49:
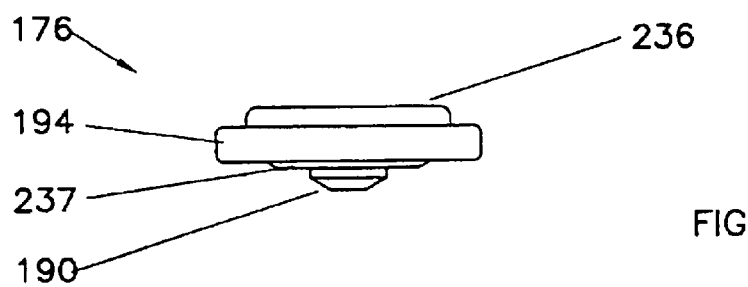
FIG. 49 is a side view of a valve diaphragm.
Figure 50:
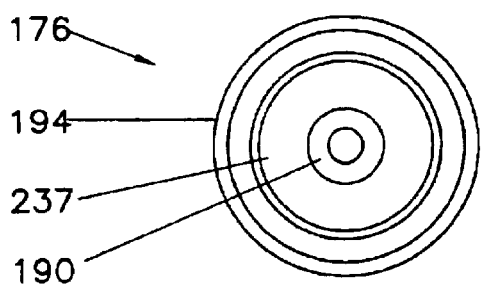
FIG. 50 is an underside view of the diaphragm.
Figure 56:
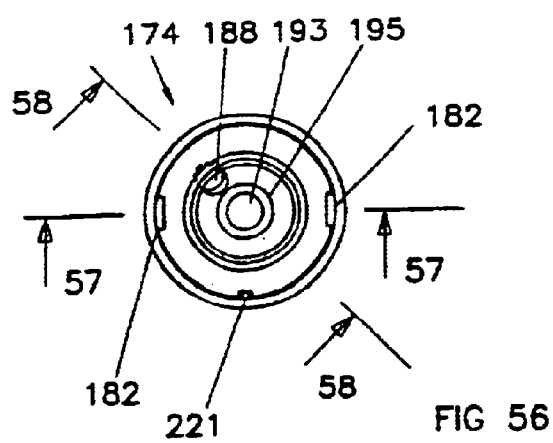
FIG. 56 is a plan view of the outer valve sleeve.
Figure 54:
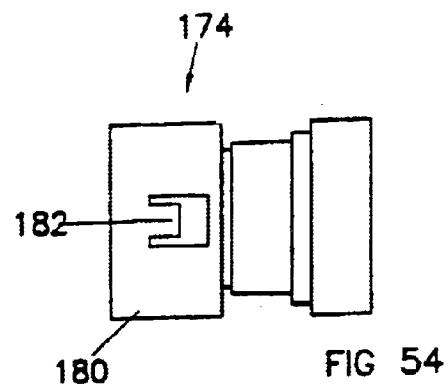
FIG. 54 is another side view of the outer valve sleeve.

In FIG. 43, the handle 12 has been rotated in an anti-clockwise direction from centre so that the bore 170 is aligned with the bore 144. This enables water from within the chamber 60 to pass through the aligned bores 170 and 144 and into the line 30. As mentioned previously, this will only occur once the handle 12 has been pressed so as to lift the plunger 58. The disc 52 closes the bores 140 and 146 in this position.

The valve assembly 14 further includes an outer valve sleeve 171 and upper and lower inner valve sleeves 172 and 174. The inner valve sleeves 172 and 174 are interlocked together, a resilient diaphragm 176 being held between the interlocked components, as shown in FIGS. 2 and 4. This effectively seals the valve chamber 60 at the upper end. The interlocked inner sleeve components are located within the outer sleeve 171 and are coupled to the handle 12 for rotation therewith whilst the outer sleeve remains stationary. The outer sleeve 171 also forms a mounting point for an upper mounting plate 178. The heads of the upper screws 38 extend from the upper mounting plate 178 to the threaded sockets 148 in the valve mounting plate 50. A bearing ring 179 is located above the lower inner sleeve 174 and beneath the upper mounting plate 178 to facilitate rotation of the interconnected sleeves 172 and 174 about the axis 40.

Figure 55:
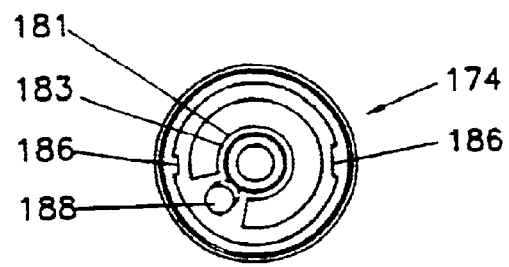
FIG. 55 is an underside view of the outer valve sleeve.
Figure 61:
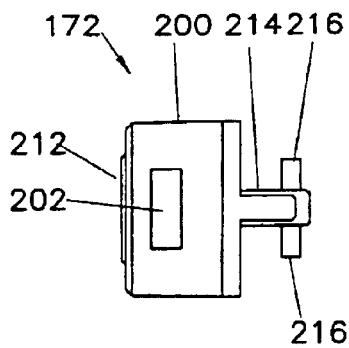
FIGS. 60 and 61 are side views of the inner valve sleeve.
Figure 63:
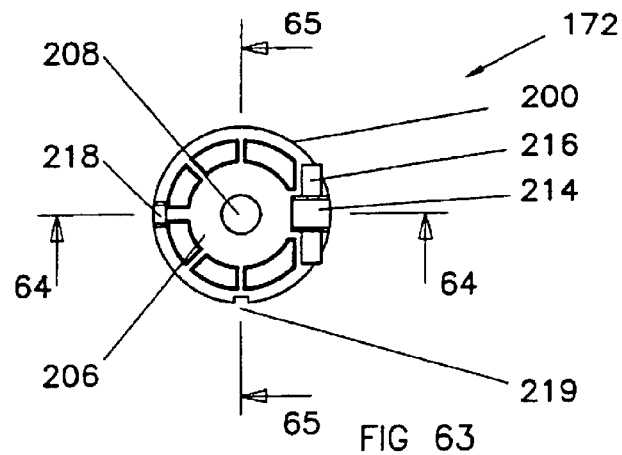
FIG. 63 is a plan view of the inner valve sleeve.
Figure 60:
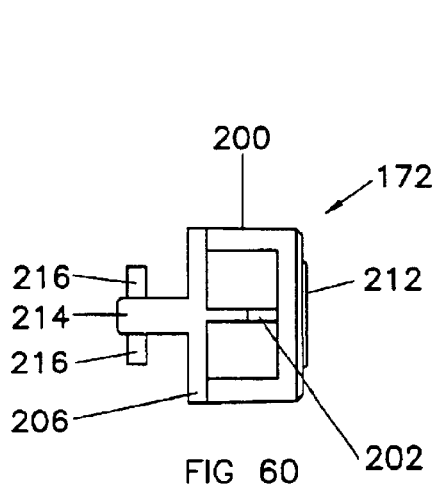
Figure 64:
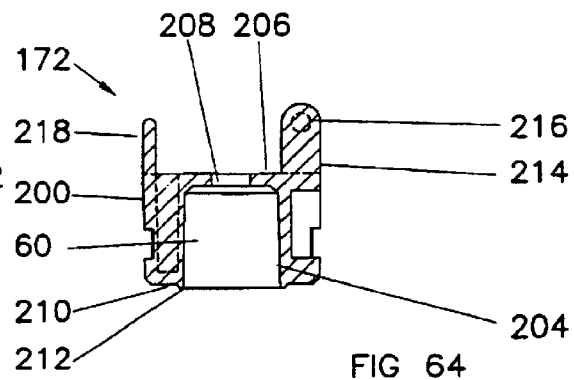
FIG. 64 is a cross-sectional view along the line 64—64.
Figure 65:
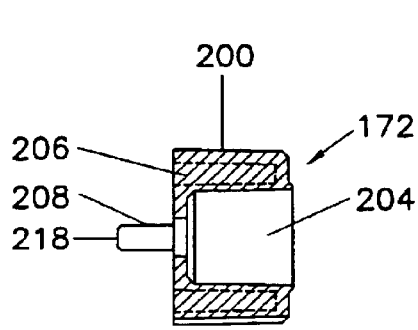
FIG. 65 is a cross-sectional view along the line 65—65.
Figure 59:
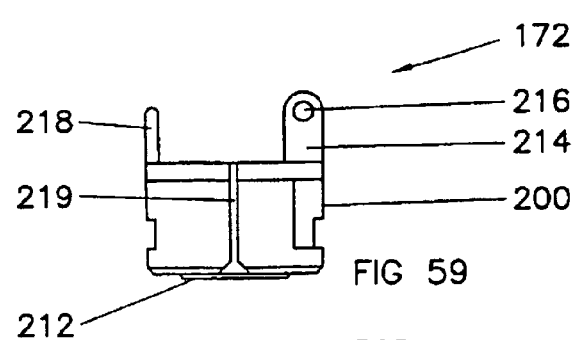
FIG. 59 is an end view of an inner valve.
Figure 62:
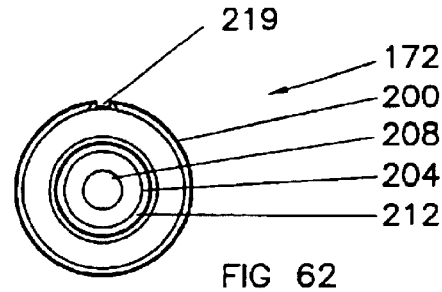
FIG. 62 is an underside view of the inner valve sleeve.
Figure 68:
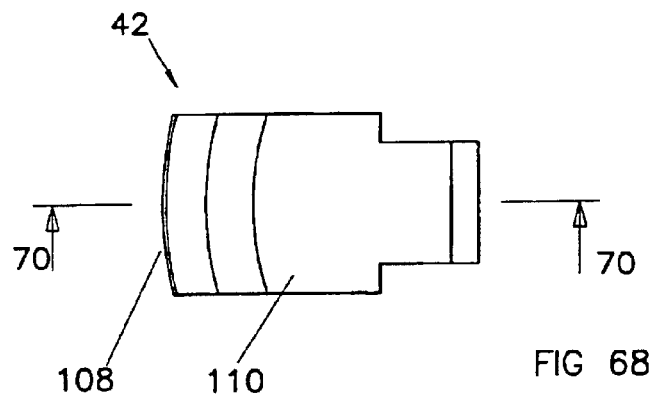
FIG. 68 is a plan view of the button.

The lower inner sleeve 174 is shown in more detail in FIGS. 53 to 58. It is integrally moulded from plastics material as a hollow wasted cylindrical body 180. The upper part of the lower sleeve 174 receives the upper sleeve 172 and the lower part of the sleeve 174 defines most of the valve chamber 60. The upper part of the sleeve 174 is provided with resilient fingers 182 for interlocking with the sleeve 172. The lower part of the body includes a cylindrical recess 184 which overlies the central body portion 132 of the valve mounting plate 50, the O-ring 136 forming a seal therewith as best seen in FIG. 4. As best seen in FIG. 55, the upper wall of the sleeve 174 includes projecting keys 186 which are complementary to the keyways 169 formed in the periphery of the ceramic disc 52. In use the ceramic disc 52 is held snugly within the lower sleeve 174 and is rotatable therewith. Preferably the key 186 and keyways 169 permit coupling in a single way.

Figure 57:
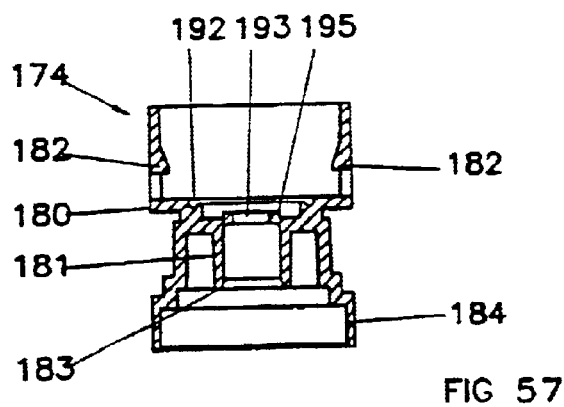
FIG. 57 is a cross-sectional view along the line 57—57.
Figure 58:
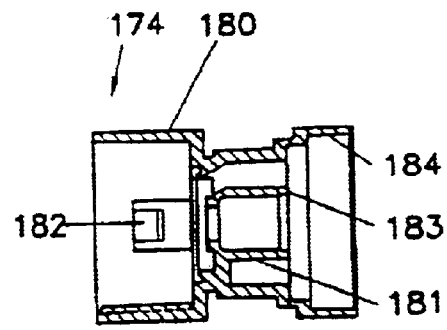
FIG. 58 is a cross-sectional view along the line 58—58.
Figure 53:
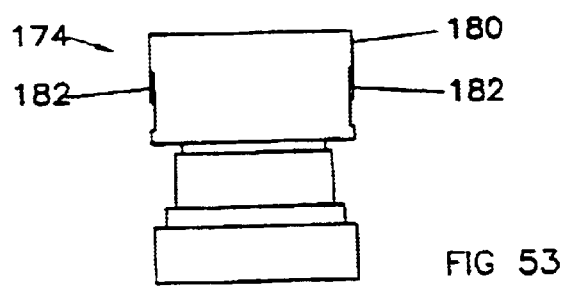
FIG. 53 is a side view of any outer valve sleeve.

The interior of the sleeve 174 is moulded with a downward skirt 181 having a lower edge 183. The sleeve includes a central bore 193 which is surrounded by a valve seat 195. As best seen in FIG. 58, the body 180 is moulded with a passageway 188 which extends from the narrow central portion of the body to the recess 184. Normally a valve element 190 is integrally formed in the middle of the diaphragm 176 is seated against the upper end of the spigot 134 to seal the bore 142 therethrough. Also, a lower face 237 of the central body portion of the diaphragm is biased into sealing engagement with the valve seat 195. When the plunger 58 is raised, the valve element 190 and face 237 are unseated which permits flow of water through the bore 142, beneath the diaphragm 176 through the passage 188 into the chamber 60. Water in the chamber 60 can then flow out of the bore 144 when the disc 52 is in the position as shown in FIG. 43. As best seen in FIG. 57, the narrow part of the body 180 is formed with an annular groove 192 which receives part of a peripheral rim 194 provided on the diaphragm 176.

The upper sleeve 172 is illustrated in more detail in FIGS. 59 to 65. It is in the form of a hollow cylindrical body 200 having recesses 202 for receipt of the fingers 182 of the lower sleeve 174. The body 200 includes a central closed recess 204 within which the plunger 58 is chiefly located. The recess 204 defines in part the valve chamber 60. The body 200 has an upper wall 206 including a hole 208 through which part of the plunger in use extends. The lower face 210 of the body 200 is formed with a lip 212 adjacent to the recess 204. The lip 212 also interlocks with the rim 194 of the diaphragm so that the diaphragm is sealingly clamped between the upper and lower sleeves 172 and 174.

The upper wall 206 of the body 200 is formed with a post 214 formed with laterally extending pivot shafts 216. Diametrically opposite to the post 214 is a projecting tongue 218. An axial locating passageway 219 is moulded in the sidewall of the body 200. This co-operates with an axial rib 221 formed on the inner wall of the lower sleeve 174 to thereby ensure these parts are properly located. In the assembled tap, the post 214 extends into the square opening of the base 85 of the handle. The pivot shafts 216 extend in the respective recesses 90 and are located just beneath the bridge members 95. The pivotal connection of the handle to the valve assembly is completed by using a locking plate 220 to lock the pivot shafts 216 in the recesses 90. The locking plate 220 is illustrated in more detail in FIGS. 78 to 80. It is generally L-shaped in cross-section and has a pair of spaced finger portions 222. The interlocking is accomplished by arranging for the finger portions 222 to be slid along the slots 91 from above the base 85 of the handle so that they underlie the pivot shafts 216. The pivot shafts 216 are then held captive between the fingers 222 and the bridge members 95, as diagrammatically illustrated in FIG. 4 and FIGS. 5A and 5B.

The upper mounting plate 178 is provided with a control opening 179 to permit the plunger 58 to pass therethrough. The plate 178 is also provided with annular slots 177 to permit the tongue 218 and post 214 to pass therethrough and be rotatable about the vertical axis 40 as shown in FIG. 4.

The plunger 58 is illustrated in more detail in FIGS. 44 to 48. It includes a plunger shaft 230 integrally formed with a main body portion 232 having a lower recess 234. The lower recess 234 in use receives a central body portion 236 of the diaphragm 176. The plunger shaft 230 includes a transverse bore 238. As best seen in FIG. 4, the plunger shaft 230 passes through the opening 208 in the upper sleeve 172 and is received within the bore 92 of the handle. An L-shaped pin 240 as shown in FIG. 77 having horizontal and vertical legs 242 and 244 is used to couple the upper end of the plunger shaft 230 to the handle. The horizontal leg 242 of the pin 240 extends in the horizontal slot 246 in the upper face 87 of the floor 85 of the handle and through the bore 238 in the plunger shaft 230. The tongue 218 formed on the upper sleeve 172 extends through a curved slot in the plate 178 and is received between a pair of fingers 250 projecting downwardly from the lower face 87. The tongue 218 thus forms a second coupling point between the valve assembly 14 and the handle 12 so as to assist in transferring rotational movement of the handle 12 about the axis 40 to the inner sleeves 172 and 174. The lunger 58 is mounted for sliding movement in the recess 204, the brain body portion 232 being guided by the recess 204. A compression spring 59 acts between the recess 204 of the upper sleeve 172 and the main body portion 232 of the plunger 58. The spring 59 therefore normally forces the valve element 190 and lower face 237 of the diaphragm 176 into firm resilient sealing engagement with the upper end of the spigot 134 and valve seat 195 so as to form a watertight seal.

Figure 29:
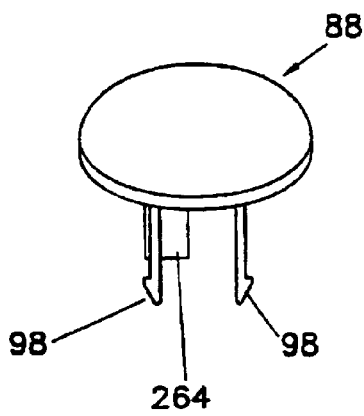
FIG. 29 is a rear view of the handle cap.
Figure 31:
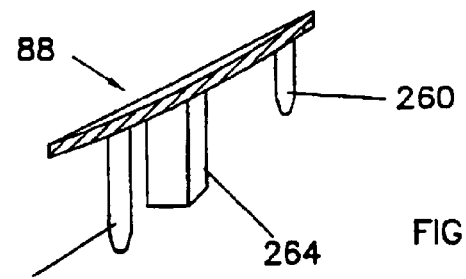
FIG. 31 is a cross-sectional view along the line 31—31.
Figure 26:
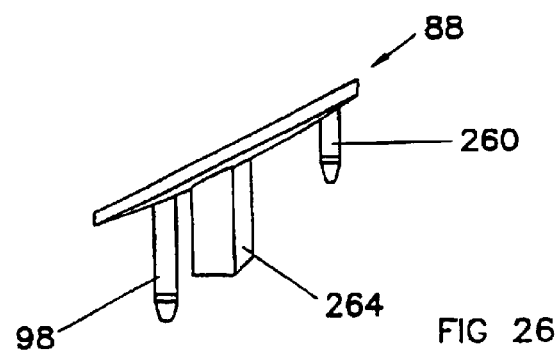
FIG. 26 is a side view of the handle cap.
Figure 27:
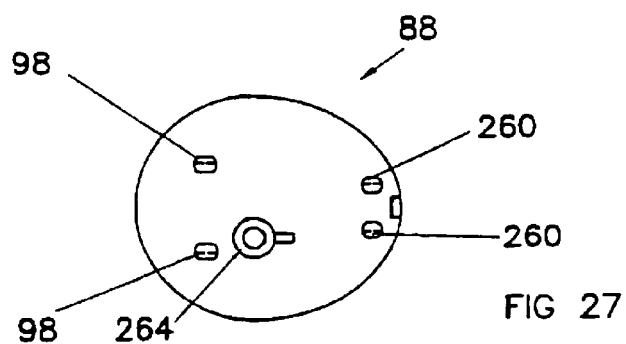
FIG. 27 is an underside view of the handle cap.
Figure 32:
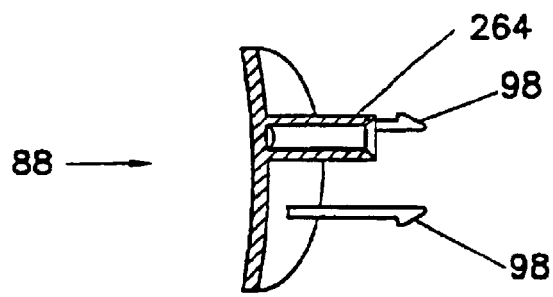
FIG. 32 is a cross-sectional view along the line 32—32.
Figure 30:
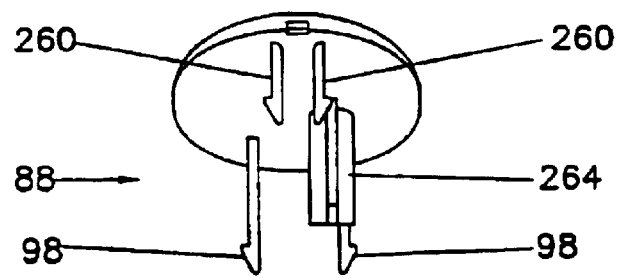
FIG. 30 is a front view of the handle cap.
Figure 33:
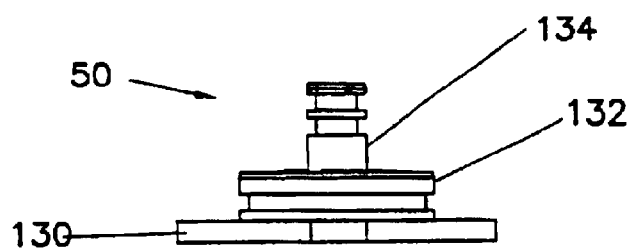
FIG. 33 is a side view of a valve mounting plate.
Figure 34:
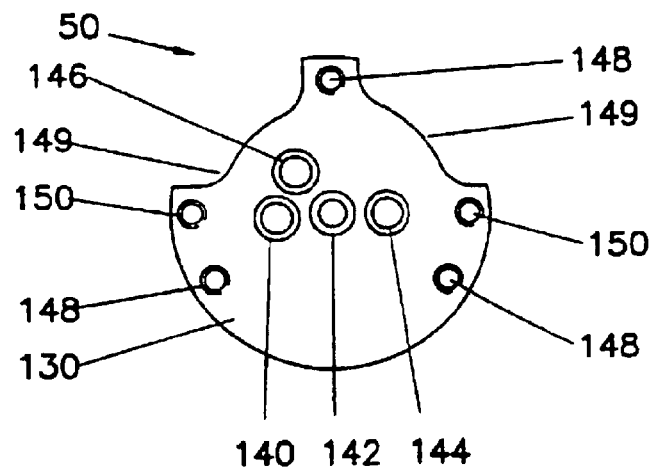
FIG. 34 is an underside view of the valve mounting plate.
Figure 35:
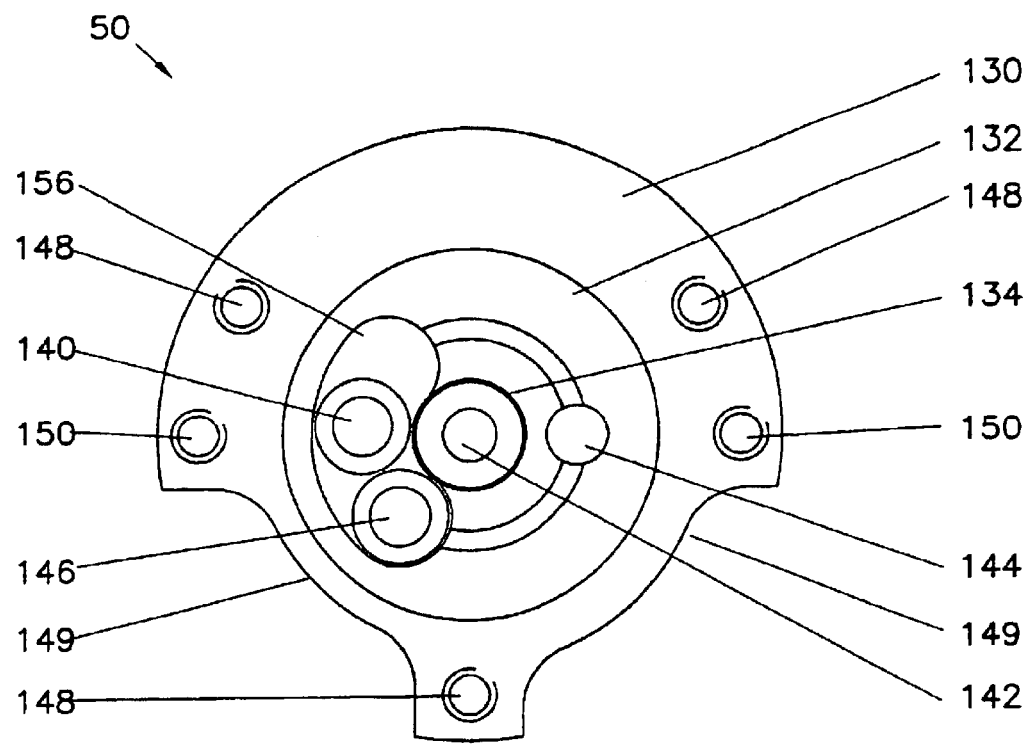
FIG. 35 is a plan view of the valve mounting plate.
Figure 36:
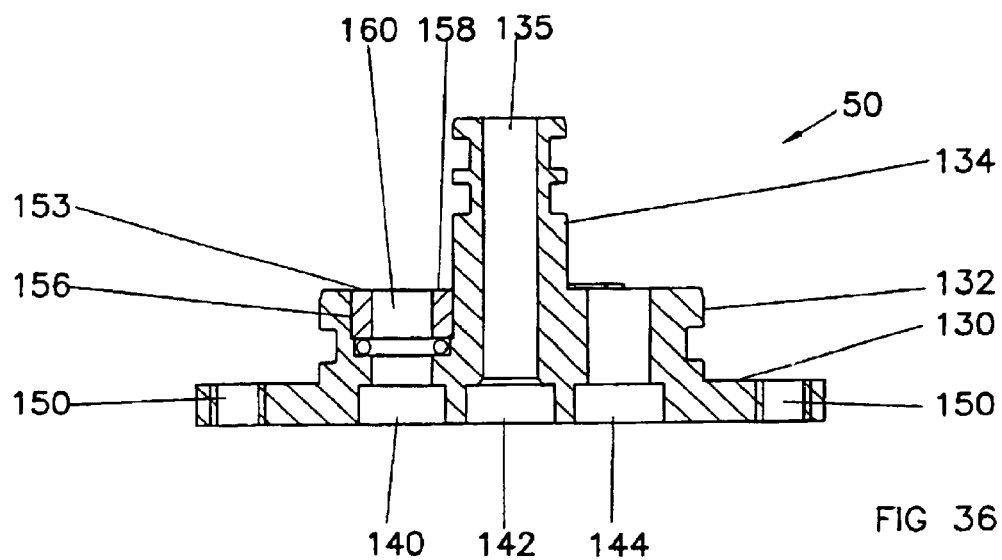
FIG. 36 is an enlarged cross-section along the line 36—36.

As best seen in FIGS. 26 and 29, the handle also includes a hollow projecting spigot 264 which in use receives the vertical leg 244 of the pin 240 so as to prevent inadvertent withdrawal of the pin 240 from the slot 246. This interconnection also permits horizontal pivoting of the handle about the axis 44.

The handle sleeve 102 includes a generally hollow body 103 moulded with a locating plate 270 which projects downwardly from its underside front face. The lower edge 272 of the locating plate 270 in use passes over the rim 78 of the top body portion 64 of the tap. The edge is thus engagable with the notches 82 and 84. The notch 82 enables the user to discern a central position of the handle 12. The notch 84 is deeper than the notch 82 and enables the user to discern when the handle 12 has been rotated to its fullest extent in a clockwise direction The depth of the notch also enables downward movement of the handle by rotation about the axis 44. The sleeve 102 also includes upper and lower openings 274 and 276 in the surface 104. These openings define a bridge portion 278. The upper opening 274 is generally aligned with the rear opening in the handle 12. These openings permit sliding movement of the button 42. The bridge portion 278 limits outward movement of the button 42 under the influence of the spring 114.

The tap of the invention can be made in a variety of materials. A prototype has been constructed in which major parts are made from the following materials:
lower body part and upper body part 62 and 64: ABS polycarbonate
handle 12: diecast zinc
diaphragm 176: nitrile
valve plate 50: brass
outer valve sleeve 171, upper and lower inner valve sleeves 172, 174, plunger 58, handle sleeve 102, nozzles 8 and 10, cap 88, button 42: acetal plastic
mounting plates 154 and 178: stainless steel
spring 260: stainless steel
ring 179: teflon Many modifications will be apparent to those skilled in the art without departing from the spirit and scope of the invention.

What is claimed is:

1. A tap (4) including:
   a tap body (16) a valve assembly (14) located within the body;
   an operating handle (12) mounted on the body and coupled to the valve assembly;
   the body having a first part spherical bearing surface (76) and the handle being provided with a complementary bearing surface (104) whereby the handle is capable of biaxial rotation about first and second axes (40,44) relative to the tap body (16) wherein the valve assembly (14) includes:
   first valve means (50,52) for controlling flow of a first liquid from a first inlet (140) to a first outlet (146), the first valve means including a first valve element (168) which opens when the handle (12) is rotated from a closed position about said first axis (40) in a first sense to first open position to permit flow of the first liquid through the valve assembly (14);
   second valve means (134,176) for controlling flow of a second liquid from a second inlet (142) to a second outlet (144), the second valve means including a second valve element (190) which opens when the handle has been rotated from said closed position about said first axis (40) in a second sense opposite to said first sense to an active position and then rotated about said second axis (44); and
   a security element (42) having a locked position in which it prevents rotation of the handle (12) about said second axis (44), the security element being such that it can be moved to an unlocked position when the handle (12) is in said active position so that the handle (12) can rotate about the second axis (44) to a second open position to thereby permit flow of the second liquid through the valve assembly (14).

2. A tap as claimed in claim 1 wherein the valve assembly (14) includes a base plate (50) and wherein the first and second inlets (140,142) and the first and second outlets (146,144) are bores through said plate (50).

3. A tap as claimed in claim 2 wherein the valve assembly (14) includes a valve disc (52) which sealingly engages a valve face (153) of the base plate (50) and wherein the valve disc (52) is mounted for rotation with the handle (12) about said first axis (40).

4. A tap as claimed in claim 3 wherein the first valve element includes said valve disc and a ceramic insert (158) and wherein the valve face includes a recess (156) within which is located said ceramic insert (158), the insert including first and second bores (160,162) which communicate with said first inlet and first outlet and wherein the valve disc includes a recess (168) which provides fluid communication between said first and second bores when the handle is in its first open position.

5. A tap as claimed in claim 2 wherein the base plate includes a spigot (134) having a spigot bore therethrough which forms said second inlet and wherein the second valve element is resilient and is biased into sealing engagement with the spigot to close said spigot bore unless the handle is moved to said second open position.

6. A tap as claimed in claim 5 wherein the second liquid flows into the valve chamber when the handle is in said second open position and wherein the first valve means includes a further bore which is aligned with the port in the base plate which forms said second outlet when the handle is in said active position.

7. A tap as claimed in claim 5 wherein the valve assembly includes, movable body portions (172,174) which together with said valve base plate define a valve chamber (60) within which a valve disc and the spigot are located.

8. A tap as claimed in claim 7 wherein the second valve means includes a diaphragm (176) which extends across said valve chamber and carries said second valve element (190).

9. A tap as claimed in claim 8 wherein the valve assembly includes a plunger (58) the lower end (234) of which is coupled to the diaphragm and wherein the upper end of the plunger is pivotally connected to said handle, the arrangement being such that on rotation of the handle about said second axis, the plunger is raised thereby unseating the second valve element from the spigot bore thereby enabling the second liquid to pass through the spigot bore; through the valve chamber, through the disc bore and through the second outlet.

10. A tap as claimed in claim 8 wherein the diaphragm is clamped between said movable body portions.

11. A tap as claimed in claim 7 wherein the movable body portions are mounted for rotation with the handle about said first axis.

12. A tap as claimed in claim 11 wherein an upper one (172) of said movable body portions is formed with pivot shafts (216) which are coupled to the handle (12) by means of a locking member (220) to thereby form a pivotal connection which permits rotation of said handle about said second axis and rotation of the movable body portions (172,174) with the handle about said first axis.

13. A tap as claimed in claim 2 wherein the security element is a button mounted for reciprocating movement in a button opening (106) in the handle.

14. A tap as claimed in claim 13 wherein a compression spring (114) biases the button to its locked position which prevents rotation of the handle about said second axis.

15. A tap as claimed in claim 14 wherein the tap body is formed with a cam member (80) which co-operates with an interlocking projection (120) on said button.

16. A tap as claimed in claim 15 wherein said cam member (80) is formed adjacent to said first part spherical bearing surface (76) and tapers in width, the arrangement being such that when the handle (12) is in said closed position, the cam (80) engages said interlocking projection (120) and prevents rotation of the handle (12) about said second axis (44) but, when the handle is rotated to said active position and the security burton (42) is pressed inwardly to its unlocked position the interlocking projection (120) disengages said cam (80) whereby the handle (12) can be rotated about said second axis (44).

17. A dispensing system (2) for dispensing chilled water and boiling or nearly boiling water, including a tap (4) as claimed in claim 1 wherein the first liquid is chilled water supplied from a chilled water line (24) connected to said first inlet (140), the tap having a chilled water outlet line (28) extending from the first outlet (146) to a tap outlet (8,10); and
   wherein the second liquid is mains water supplied from a mains water line (26) connected to said second inlet (142);
   and boiler unit (16) having an inlet (18) coupled to receive mains water from the second outlet (144) and an outlet line (32) extending to the tap outlet (8,10).

18. A system as claimed in claim 17 wherein the boiler unit (16) includes a vent outlet (22) which is coupled to said tap outlet (8,10) by a vent line (34).

* * * * *